United States Patent [19]

Nakajima et al.

[11] Patent Number: 5,443,812
[45] Date of Patent: * Aug. 22, 1995

[54] STABILIZED SYNTHETIC ZEOLITE AND A PROCESS FOR THE PREPARATION THEREOF

[75] Inventors: Kazuhiko Nakajima; Satoshi Ando; Akira Dohn, all of Osaka; Hideo Yoshitome, Kishiwada, all of Japan

[73] Assignee: Kanebo Ltd., Tokyo, Japan

[*] Notice: The portion of the term of this patent subsequent to Apr. 22, 2010 has been disclaimed.

[21] Appl. No.: 1,415

[22] Filed: Jan. 7, 1993

Related U.S. Application Data

[63] Continuation of Ser. No. 884,289, May 13, 1992, abandoned, which is a continuation of Ser. No. 511,427, Apr. 23, 1990, abandoned.

[30] Foreign Application Priority Data

| | | | |
|---|---|---|---|
| Apr. 24, 1989 | [JP] | Japan | 1-1017772 |
| Jul. 24, 1989 | [JP] | Japan | 1-188884 |
| Aug. 18, 1989 | [JP] | Japan | 1-211259 |
| Dec. 27, 1989 | [JP] | Japan | 1-339222 |
| Feb. 20, 1990 | [JP] | Japan | 2-37355 |
| Feb. 23, 1990 | [JP] | Japan | 2-43269 |
| Feb. 23, 1990 | [JP] | Japan | 2-43270 |

[51] Int. Cl.$^6$ ............................................. C01B 39/02
[52] U.S. Cl. ............................................................. 423/700
[58] Field of Search ................ 423/700; 252/313.1, 252/136, 174.25, 179; 424/52, 49

[56] References Cited

U.S. PATENT DOCUMENTS

| | | | |
|---|---|---|---|
| 3,383,169 | 5/1968 | Young | 502/79 |
| 3,460,904 | 8/1969 | Young | 423/709 |
| 3,475,345 | 10/1969 | Benesi | 502/74 |
| 3,488,146 | 1/1970 | Reid, Jr. | 502/79 |
| 3,582,379 | 6/1971 | Hackbarth et al. | 106/483 |
| 4,102,977 | 7/1978 | Sugahara et al. | 423/742 |
| 4,222,995 | 9/1980 | Roebke et al. | 423/714 |
| 4,271,135 | 6/1981 | Wuest et al. | 423/710 |
| 4,280,920 | 7/1981 | Garvey et al. | 252/173 |
| 4,336,234 | 6/1982 | Leutner et al. | 423/714 |
| 4,349,533 | 9/1982 | Dent et al. | 424/52 |
| 4,405,483 | 9/1983 | Kuzel et al. | 252/140 |
| 4,477,423 | 10/1984 | Sanders | 423/700 |
| 4,529,541 | 7/1985 | Wilms et al. | 252/174.25 |
| 4,623,166 | 11/1986 | Nakazawa et al. | 252/174.25 |
| 5,206,195 | 4/1993 | Ando et al. | 423/713 X |

FOREIGN PATENT DOCUMENTS

| | | | |
|---|---|---|---|
| 2143340 | 2/1973 | France. | |
| 2415076 | 8/1979 | France. | |
| 2540093 | 8/1984 | France. | |
| 61-256915 | 11/1986 | Japan. | |
| 4292412 | 10/1992 | Japan | 423/700 |

*Primary Examiner*—Mark L. Bell
*Assistant Examiner*—David Sample
*Attorney, Agent, or Firm*—Nixon & Vanderhye

[57] ABSTRACT

Synthetic zeolite is stabilized to water by soaking it in an acid solution for a prolonged time. The stabilized synthetic zeolite does not exhibit alkalinity when it is dispersed in water at room temperature or elevated temperatures for 24 hours or more.

24 Claims, 4 Drawing Sheets

STABILIZED SYNTHETIC ZEOLITE AND A PROCESS FOR THE PREPARATION THEREOF

This application is a continuation of application Ser. No. 07/884,289 filed May 13, 1992, now abandoned which is a continuation of application Ser. No. 07/511,427 filed Apr. 23, 1990, now abandoned.

FIELD OF THE INVENTION

This invention relates to stabilized synthetic zeolite which does not show auto-decomposition in water and a process for the preparation thereof.

PRIOR ART

Zeolite has its specific micropore diameter, surface electric field, ion exchange ability and adsorption-isolation ability, and is drawing attention as a very useful functional material. Particularly, synthetic zeolite has been used in various fields because it may be produced with uniform quality, which is characteristic of a synthetic material, in a large amount and are available constantly.

Synthetic zeolite is usually prepared by mixing solutions of sodium silicate, sodium aluminate and sodium hydroxide, ripening a mixture, and filtering the resultant gel, followed by washing with water and drying.

Zeolite may also support other metal ions through ion exchange. Such zeolite with specific metal ions has functions attributable to the metal ions as well as functions intrinsic to zeolite. For instance, French Patent 1,061,158, U.S. Pat. No. 4,775,585, and allowed U.S. patent application Ser. Nos. 269,299 and 301,909 filed in December 1988 disclose antibacterial compositions containing zeolite which is ion-exchanged with antibacterial ion such as copper, zinc or silver. Transitional metals such as nickel may be supported on zeolite to give catalytic activity to it.

Synthetic zeolite previously available on market is washed with water in a later step of a production process. Nevertheless, when it is dispersed in water, the dispertion shows strong alkalinity synthetic zeolite is used in a large amount in detergents, where the alkalinity of Synthetic zeolite is rather advantageous. Synthetic zeolite is also used in adsorbents, catalysts, carriers, ion exchangers and fillers. In some of these fields, the alkalinity of synthetic zeolite is a drawback.

As will be shown in the following Example, some of synthetic zeolite prepared by Japanese and foreign manufacturers and the present inventors have now been examined, where synthetic zeolite dispersions of a concentration of 50 g/liter were maintained at a temperature of 37° C. for 24 hours. Then, their pH's were about 10 or higher. The existence of aluminium was observed at about 8 to 40 ppm in the dispersions. When synthetic zeolite dispersions of 50 g/liter were maintained at 80° C. for 24 hours, their pH's were about 11 or higher and about 10 to 50 ppm of aluminium were confirmed in the dispersions. Even when synthetic zeolite was freshly washed with a large amount of water before examined, the dispersions were still found to show strong alkalinity. Alternatively, synthetic zeolite was neutralized with dilute acid, separated, washed with water, and then dispersed in water as aforesaid. The dispersions were alkaline as well. All of the examined synthetic zeolite showed strong alkalinity and elution of aluminium. A drop (0.03 ml) of a normal hydrochloric acid solution was added to 100 ml of a dispersion of certain synthetic zeolite of a concentration of 50 g/liter which would otherwise show a pH of 11 after allowed to stand for 24 hours, the pH after 24 hours was about 11. That is, the pH was the same as that of the case where hydrochloric acid was not dropped. Separately, a drop (0,03 ml) of a normal sodium hydroxide solution was added to a zeolite dispersion similar as aforesaid, the pH after 24 hours was again 11.

Meanwhile, a dispersion of a certain type of natural zeolite in water showed a pH of 6.8 and the concentration of aluminium was less than the detection limit (0.5 ppm). When normal hydrochloric acid was dropped to the same zeolite dispersion, the pH became 5.0 immediately and did not change even after 24 hours. On the other hand, when normal sodium hydroxide was dropped to the same zeolite dispersion, the pH became 9.0 immediately and did not change even after 24 hours.

As seen above, previous synthetic zeolite shows remarkable alkalinity unlike natural zeolite and, even after washed with water or neutralized in a conventional manner, still exhibits remarkable alkalinity. It is believed that this is due to a phenomenon that synthetic zeolite disintegrates gradually of itself or alkaline substances which were confined in synthetic zeolite during production exudes gradually from zeolite. In natural zeolite, unstable structure of zeolite or alkaline substances may be removed, for instance, by being washed with rain in a vast period of time.

The aforesaid property of synthetic zeolite remains even after ion-exchanged. Ion-exchanged synthetic zeolite similarly shows remarkable alkalinity. As will be illustrated in the following Example, a pH of 10 was observed in an aqueous dispersion of synthetic zeolite which had been ion-exchanged in an acid condition for more than 5 hours. Such alkalinity may sometimes be a drawback when ion-exchanged zeolite is used in antibacterial agents, adsorbents, catalysts, carriers and fillers.

SUMMARY OF THE INVENTION

An object of the invention is to remove the unstability of synthetic zeolite with water and humidity in air and to provide synthetic zeolite whose dispersion in water does not exhibits alkalinity.

Another object of the invention is to provide a process for the preparation of such stable synthetic zeolite.

The present inventors have now found that the envisaged stable zeolite is obtained by a process where synthetic zeolite is soaked in an acid aqueous liquid; acid is replenished to maintain the pH of the soaking liquid at a predetermined value of about 7 or less and the soaking is continued until the pH remains approximately constant for at least one hour without replenishing the acid; and then the synthetic zeolite is heat-dried without being washed or after washed in conditions that the pH of a washing liquid does not substantially exceed about 6.5.

The synthetic zeolite according to the invention is characterized in that the pH of dispersion water of a synthetic zeolite dispersion is in a range of from 5 to 7, where synthetic zeolite is dispersed in distilled water at a concentration of 50 g/liter and maintained at a temperature of 20° to 25° C. for 24 hours.

The present inventors have further found modification of the process where the aforesaid process is preceded by a step in which synthetic zeolite is soaked in a more acid liquid having a pH of 4 or less. That is, a modified process of the invention comprises the following steps:

(A) synthetic zeolite is soaked in an acid aqueous liquid maintained at a pH of 4 or less, wherein acid is replenished, if needed, to maintain the pH of the soaking liquid at 4 or less; then (B) synthetic zeolite is soaked in a soaking liquid of a pH of 7 or less, and the pH of the soaking liquid is confirmed to remain constant at a value of 7 or less without replenishing acid, provided that if the pH of the soaking liquid does not become constant at 7 or less, acid is added and the soaking is continued at a pH of 7 or less and then the confirmation of pH is conducted without replenishing the acid; and (C) synthetic zeolite is heat-dried without being washed or after washed in conditions that the pH of a washing liquid does not substantially exceed about 6.5.

The synthetic zeolite thus obtained according to the invention is characterized in that the pH of dispersion water of a synthetic zeolite dispersion, determined at room temperature, is in a range of from 5 to 7, where synthetic zeolite is dispersed in distilled water at a concentration of 50 g/liter and maintained at a temperature of 50° C. for 24 hours.

In another modification of the process of the invention, a gel-forming substance is added to the soaking liquid. The synthetic zeolite thus obtained is synthetic zeolite whose surface is covered with semipermeable gel.

BRIEF DESCRIPTION OF THE DRAWINGS

FIGS. 3 and 4 are for comparison.

DETAILED DESCRIPTION OF THE INVENTION

Figure 1:
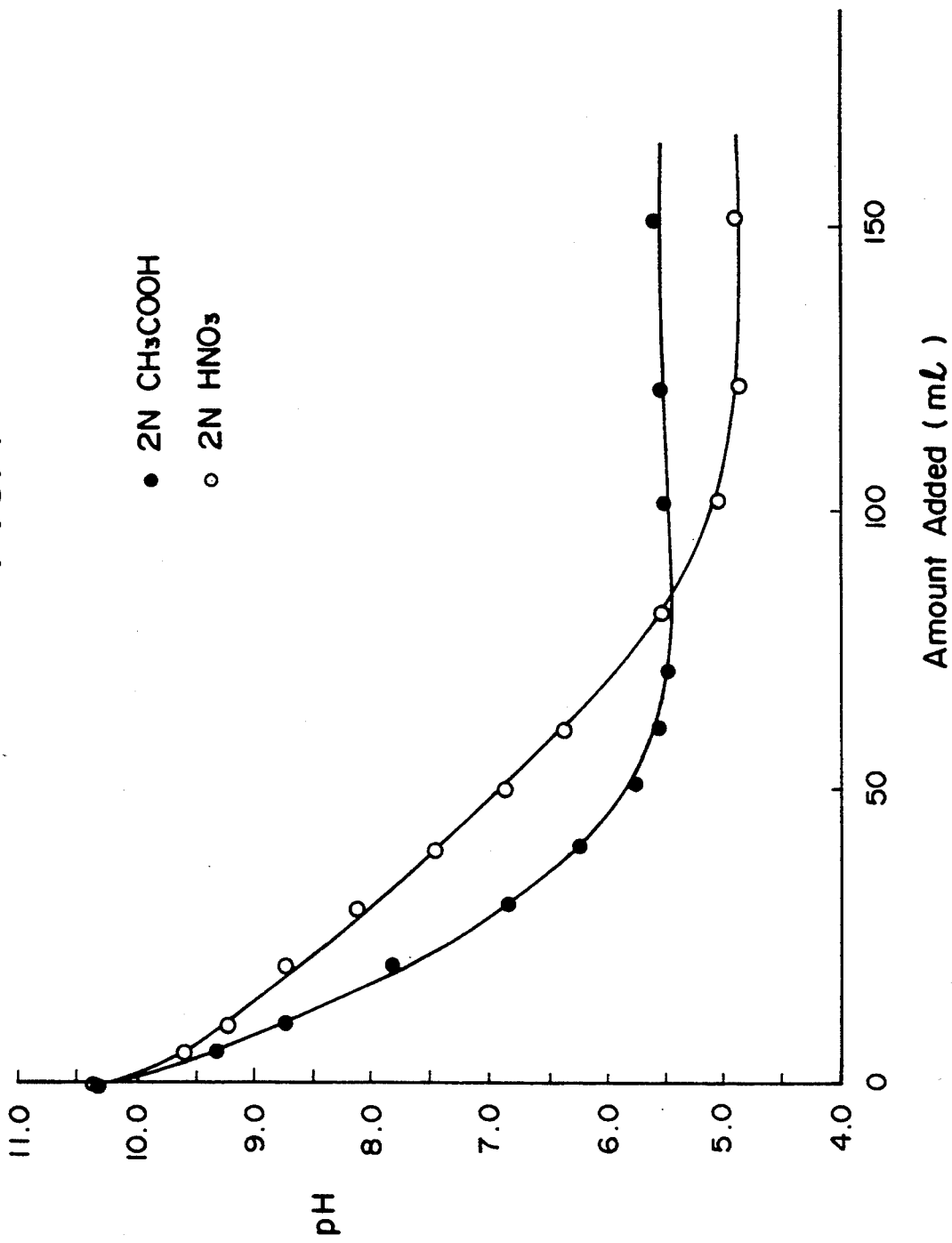
FIG. 1 is a graph in which pH's of zeolite dispersions are plotted against the amounts of acid added. Black dots represent pH's when acetic acid is used as acid; and circles, nitric acid.

It is essential to the process of the invention that a soaking liquid remains approximately constant, particularly at pH 7 or less, for a long time even without addition of acid and, then, synthetic zeolite is heat-dried without being washed or, if washing is conducted, after washed in conditions that it is avoided that the pH of a washing liquid exceeds 6.5 for a substantively long time. Mere washing with water or mere neutralization as previous cannot attain the purpose of the invention as a matter of course. Further, the purpose of the invention cannot be attained if heat drying is conducted after the pH of a washing liquid exceeds 6.5 or, particularly, becomes neutral due to washing with a large amount of water even though the soaking is carried out beforehand. In contrast, once heat drying is carried out after the soaking without washing or with washing in conditions that the pH of a washing liquid does not substantially exceed 6.5, a dispersion of the synthetic zeolite does not show alkalinity even if the synthetic zeolite is washed with water later. This was not expected at all.

Synthetic zeolite used in the invention includes all types of synthetic zeolite. Synthetic zeolite generally represented by the formula, $xM_{2/n}O \cdot Al_2O_3 \cdot ySiO_2 \cdot zH_2O$, taking $Al_2O_3$ as a standard, wherein M is monovalent or divalent metal, particularly alkali metal such as sodium and potassium, n is its valency, and x, y and z are chemical factors of metal oxide and silicon dioxide and the number of crystal water, respectively. Many types of synthetic zeolite are known which have different compositions, micropore diameters, specific surface areas and so on. Examples of typical synthetic zeolite include zeolite A ($SiO_2/Al_2O_3=1.4$ to 2.4), zeolite X ($SiO_2/Al_2O_3=2$ to 3), zeolite Y ($SiO_2/Al_2O_3=3$ to 6) and mordenite ($SiO_2/Al_2O_3=9$ to 10).

M in the above formula is generally sodium or potassium, but a part or the whole of M may be replaced with heavy metal such as iron, zinc, copper, tin, silver, vanadium, wolfram, nickel, molybdenum, antimony and chromium, light metal such as calcium, magnesium, lithium and aluminum, or ammonium ion.

In a basic embodiment of the process according to the invention, synthetic zeolite is soaked in an acid aqueous liquid; acid is replenished to maintain the pH of the soaking liquid at a predetermined value of about 7 or less and the soaking is continued until the pH remains approximately constant for at least one hour without replenishing the acid; and then the synthetic zeolite is heat-dried without being washed or after washed in conditions that the pH of a washing liquid does not substantially exceed about 6.5.

The acid aqueous liquid used to soak synthetic zeolite is an aqueous solution of inorganic acid and/or organic acid. For instance, inorganic acid such as hydrochloric acid, sulfuric acid, nitric acid and phosphoric acid, and organic acid such as formic acid, acetic acid, oxalic acid and tartaric acid may be used. Although various acids may be used in the invention as stated above, weak acid is preferred such as acetic acid, formic acid, tartaric acid, adipic acid and boric acid. When two-normal nitric acid, for instance, is gradually added to a zeolite dispersion in distilled water, increased viscosity of the disperion and considerable bubbling are observed. On the other hand, two-normal acetic acid is added, only a little bubbling is observed and, in addition, the pH of the zeolite dispersion becomes approximately constant more quickly. It is believed that the reason for this is as follows: where strong acid is added (replenished) to a soaking liquid in which zeolite is dispersed, the pH of a soaking liquid becomes low locally if stirring is insufficient, and the zeolite is rapidly destroyed in part (for instance, zeolite A is destroyed rapidly at a pH of about 4 or less); meanwhile, when weak acid such as acetic acid or formic acid is used, local decrease in pH of a soaking liquid is small and, therefore, rapid destruction of zeolite scarcely takes place, so that the weak acid added is not consumed for destruction of zeolite, but causes the treatment of the invention to proceed moderately. Besides the local change in pH, weak acid acts slowly on zeolite, compared to strong acid. Accordingly, a risk of unduly damaging zeolite is less in the prolonged soaking according to the invention. Both inorganic acid and organic acid may be used in combination. Two or more inorganic acids or organic acids may be used in mixture. The solvent is usually water, which may contain small amounts of organic solvents and/or surface active agents. Further, inorganic or organic salts soluble in the acid aqueous liquid may be added, if needed.

The initial pH of the soaking liquid is set to 7 or less, preferably 4.0 to 6.5, more preferably 4.5 to 6.5. With the progress of the soaking treatment, the pH will rise. Accordingly, the pH is adjusted with acid (solution).

The soaking may be conducted in any manner. For instance, an acid aqueous liquid is placed in a vessel provided with a stirrer, to which synthetic zeolite is added little by little under stirring. During this process, the pH of the dispersion liquid goes up. Then, acid is added properly to maintain the pH at a predetermined value of 7 or less. Even after all zeolite is dispersed, acid is added to maintain a predetermined pH under continued stirring. The soaking is ended after it is confirmed that the pH remains almost constant ($\pm 0.5$, preferably $\pm 0.3$) without addition of acid. In general, the soaking is continued for additional 1 hour or more, preferably additional 3 hours or more, after the pH becomes almost constant without addition of acid. Stability of the product zeolite becomes better with prolonged treatment after approximately constant pH is attained. To illustrate treatment conditions, the treatment is conducted at a temperature of 10° to 50° C. under moderate stirring of 100 to 2,000 rpm with a final synthetic zeolite solid particle concentration of 5 to 40% by weight. The treatment time may be shortened with an extremely low concentration of synthetic zeolite and an elevated temperature. Stirring speed affects the treatment time only a little.

In contrast with the above, zeolite may first be dispersed in water, to which acid is added little by little to perform soaking. Treatment pH and time period may be the same as stated above.

Alternatively, the soaking of synthetic zeolite may be performed as a final step of the preparation of synthetic zeolite. That is, the aforesaid soaking may be carried out by separating a slurry after reaction which contains zeolite gel formed from an aqueous solution of sodium silicate, sodium aluminate and sodium hydroxide and adding acid to the produced zeolite. Preferably, zeolite is separated from the slurry and washed with water as in a conventional process and, thereafter, a slurry of the zeolite is added to acid water to perform the soaking.

What is important in the soaking with acid is that the soaking is not ended in a short period of time as in usual neutralization, but is continued until the pH of the liquid remains almost constant for at least 1 hour, preferably at least 3 hours, without further addition of acid. Depending upon the types and preparation methods of synthetic zeolite, it is sometimes impossible to maintain the pH constant at a predetermined value for a predetermined time. In such a case, a pH value at which a constant pH is attained without addition of acid may be found by conducting the soaking with aimed pH values being changed (generally speaking, on the more acid side).

After synthetic zeolite is soaked in the acid aqueous liquid for a sufficient period of time as described above, the synthetic zeolite is generally separated from the liquid, which may be performed in any manner such as filtration or decantation.

The separated zeolite is subjected to heat drying without being washed. Alternatively, it may be washed on a condition that the pH of a washing liquid does not substantially exceed 6.5. With "does not substantially exceed 6.5" used herein, it is meant that the pH of a washing liquid at the end of washing is 6.5 or less. Even if the pH of a washing liquid exceeds for a short time, it is possible to obtain stabilized synthetic zeolite aimed in the invention. Acid aqueous liquids may be used in washing operation. For the acid, any acid capable of being used in the soaking may be adopted. The pH of the acid aqueous liquid is preferably similar to or less than that of the soaking, but may be higher than that. It is also possible to conduct washing with a small amount of water. A considerable amount of acid used in the soaking remains on zeolite, depending upon a pH in the soaking and a manner of separation from a soaking liquid, for instance, in a case where the soaking is carried out at a lower pH or separation of zeolite from a soaking liquid is carried out by decantation. Then, the pH of a washing liquid is 6.5 or less at the end of washing with a relatively small amount of water. Thus the purpose of the invention can be attained. Washing operation itself may be carried out in various conventional manner. For instance, separated synthetic zeolite is placed in a vessel provided with a stirrer, to which a washing liquid is added, followed by stirring to wash. Alternatively, a washing liquid is poured to zeolite in a separation instrument. Washing is conducted usually with a washing liquid of an amount 0.5 to 100 times as much as the zeolite at room temperature, but other conditions are also allowed. In such washing operation, the quality of the product is improved, for instance, by removal of impurities formed from zeolite during the soaking.

Next, the synthetic zeolite obtained is heat dried, which is usually carried out at a temperature of 100° C. or higher, preferably 120° C. or higher, more preferably 130° C. or higher, for at least 1 hour, preferably at least 3 hours, at atmospheric pressure or, optionally, reduced pressure. Accompanying acid vaporizes usually during such heat drying. Accordingly, it is apparent that accompanying acid is not a reason why synthetic zeolite of the invention does not exhibit strong alkalinity when dispersed in water. The effect of the invention is attained only when the heat drying is carried out without washing or with the defined washing after the soaking according to the invention. The purpose is not attained if synthetic zeolite is washed with a large amount of water after the soaking and then heat-dried. Meanwhile, even if synthetic zeolite finished according to the invention is later washed with a large amount of water, the effect of the invention is not lost.

The aforesaid series of operations comprising soaking, optional washing, and heat drying may be repeated plural times.

The invention shall not be limited by any particular theory, but it is believed that a sol substance covers the surface of synthetic zeolite in the acid treatment according to the invention. That is, silicon and aluminium atomic groups (ionic groups) which are released via destruction from defects of zeolite crystal structure or raw materials of zeolite which are confined in zeolite react with acid to form a sol substance on the surface of zeolite. When synthetic zeolite is then heat-dried, the sol substance is thought to dehydrate and become a xerogel. Once a xerogel layer is formed, this does not fall off even in washing with water. Meanwhile, a sol substance before heat-dried is delicate and will fall off in washing with water in a neutral or alkaline atmosphere. When the synthetic zeolite of the invention is dispersed in water, the xerogel layer is believed to act as a so-called semipermeable layer to prevent aluminium and silicon atomic groups from going out from zeolite into water. When the synthetic zeolite of the invention is dispersed in acid water (with hydrochloric acid, pH 2 to 3) or alkaline water (with sodium hydroxide, pH 10 to 11) at a solid/liquid ratio of 1/10, the dispersion water exhibits the same pH, e.g. 6.8, in both cases. In addition, destruction of the synthetic zeolite is not found and no aluminium ion is detected in the dispersion water.

As described above, the synthetic zeolite of the invention is very stable in water. After the synthetic zeolite of the invention is dispersed in distilled water at a concentration of 50 g/liter and maintained at a temperature of 20° to 25° C. for 24 hours, preferably 72 hours, the pH of the dispersion water remains in a range of from 5 to 7, preferably 6.0 to 6.8. The stability of the synthetic zeolite of the invention is also confirmed by a fact that no aluminum ion is detected in the dispersion water, as will be explained in the following Examples. With conventional synthetic zeolite, the pH of dispersion water shows strong alkalinity and aluminium ion is detected after 24 hours.

Metal ion may be added to the acid aqueous liquid to thereby perform ion exchange at the same time with the stabilization of zeolite. Metal ion is not particularly limited and any ion-exchangeable metal ion may be used, such as iron, zinc, copper, tin, silver, vanadium, wolfram, nickel, barium, molybdenum, antimony, chromium, calcium, magnesium, manganese, lithium, aluminium, titanium, gallium and germanium. Accordingly, metal ion to be supported by zeolite may be selected to fit to application envisaged. To illustrate the preparation of antibacterial zeolite as an instance, antibacterial metal ions, preferably silver, copper and zinc, are used.

A soluble salt, such as nitrate, sulfate and chloride, is dissolved in an acid aqueous liquid to prepare a metal ion solution. However, other methods may be adopted. For instance, metal powder may directly be dissolved in an acid aqueous liquid used in ion exchange to prepare the solution.

Any manner may be used for the ion exchange-soaking. Usually, zeolite or zeolite dispersion, acid or acid solution and a solution containing metal ion to be supported are mixed, but there is no limitation on the order of their mixing. For instance, synthetic zeolite is dispersed in an acid aqueous solution and then acid is replenished properly to maintain a predetermined pH while a metal ion solution is gradually added. To illustrate treatment conditions, the treatment is conducted in the presence of about 1 to 10%, based on synthetic zeolite, of metal ion at a temperature of 10° to 80° C. under moderate stirring of 100 to 2,000 rpm with a final synthetic zeolite solid particle concentration of 5 to 80% by weight.

Before the ion exchange simultaneous with the soaking, synthetic zeolite is preferably washed with an aqueous acid solution, particularly aqueous weak acid, whereby the product synthetic zeolite has higher whiteness and better resistance to discoloring. It is believed that chlorine and sulfur are washed off, which may cause discoloration through formation of metal chloride or sulfide such as AgCl or $Ag_2S$. Synthetic zeolite is washed, for instance, for one hour, separated from the washing liquid and then subjected to the soaking/ion exchange of the invention.

It should be noted that Japanese Patent Application Laid-Open No. 203723/1984 discloses modified zeolite, wherein mineral components in sea water are supported on zeolite and its equilibrium pH is adjusted to 10.5 or less. The equilibrium pH is preferably 9.5 to 4.5, and one having an equilibrium pH of 6.5 is described in a working example. However, the equilibrium pH referred to therein is a pH value of an aqueous slurry of 5 g/100 ml only 30 minutes after it is prepared. The present inventors have found that equilibrium pH cannot be reached in 30 minutes. For instance, when conventional synthetic zeolite is neutralized with a hydrochloric acid solution of a pH of 2.5 and dispersed in water, the pH of the dispersion water is 6.5 after one hour, but remarkably increases up to 8.9 after 24 hours. Accordingly, the zeolite of "equilibrium pH" mentioned in the above patent application does not suggest the present invention. Further, the treatment of zeolite with acid is simply referred to as "neutralization treatment", and therefore, does not suggest the prolonged treatment of the invention. When conventional synthetic zeolite is neutralized with acid, it is outwardly neutralized quickly. However, even if it is next dried without washing, its dispersion in water exhibits strong alkalinity, again.

In a modified embodiment of the invention where synthetic zeolite is stabilized by soaking in an acid aqueous liquid, synthetic zeolite is first soaked in a more acid aqueous liquid of a pH of 4 or less (step A), followed by soaking in a moderate condition of pH 7 or less (step B) and heat drying (step C) as described above. The acid aqueous liquid to soak synthetic zeolite is an aqueous solution of inorganic acid and/or organic acid. For instance, inorganic acids such as hydrochloric acid, sulfuric acid, nitric acid and phosphoric acid are preferred as the effect of the treatment according to the invention might be attained with the use of a smaller amount of them. Organic acids such as formic acid, acetic acid, oxalic acid and tartaric acid are characterized and preferred in that pH might easily be adjusted with their use. Characteristics of inorganic acids and organic acids are different from each other as mentioned above, and both of them may be used in combination so as to skilfully utilize their advantages. Two or more types of inorganic acids or organic acids may be used in mixture. The solvent is usually water, which may contain small amounts of organic solvents.

The initial pH of the soaking liquid in step (A) is set to 4 or less, preferably from 3.0 to 3.8. In general, its pH will rise quickly above 4 during the soaking. Therefore, acid is continually added to maintain the pH at 4 or less, preferably from 3.0 to 3.8. The soaking of step (A) is continued preferably within one hour, particularly in 10 to 30 minutes.

In step (B), it is secured or confirmed that zeolite after treated in step (A) exhibits a constant pH. The soaking liquid of a pH of 7 or less to be used in step (B) may be prepared separately, in which zeolite separated from step (A) is dispersed. However, in a preferred embodiment, the zeolite/soaking liquid system from step (A) is used as such. The pH of this zeolite/soaking liquid system rises gradually up to 4 or higher, sometimes higher than 7, without addition of acid. Alternatively, an alkali may be added to the zeolite/soaking liquid system from step (A) to adjust its pH in a range of from 4 to 7 and, then, step (B) is conducted. In any manner, zeolite is soaked at a pH of 7 or less, preferably from 4.0 to 6.5, preferably 4.5 to 6.0, in step (B), while acid is added to maintain the pH, if needed. After it is confirmed that the pH remains constant (±0.5, preferably ±0.3) for at least half an hour, preferably at least one hour (up to three hours satisfactory in general) without addition of acid, step (C) is performed. If the pH are not constant, acid is added, soaking is further continued and, again, the pH is observed without addition of acid. Whether addition of acid is needed in step (B) or not, the whole soaking time in step (B) is preferably at least one hour. The longer this period of time, the better the stability of a product zeolite. In an initial stage of step (B), acid is added to maintain the pH at a predetermined value of 7 or less.

Soaking in step (A) and step (B) may be conducted in any manner as described above.

What is important in the soaking with acid is that zeolite is soaked in stronger acid of a pH of 4 or less, and further soaked in a soaking liquid of a pH of 7 or less until the pH of the liquid becomes almost constant without addition of acid, which is different from usual neutralization.

Heat drying step (C) after step (B) may be conducted as described above.

The aforesaid steps (B) and (C) may be repeated plural times.

The invention should not be limited by a particular theory, but it is believed that synthetic zeolite is dissolved in part in the treatment with acid according to the invention, which then covers the surface. That is, first in step (A), crystal structure on the surface of zeolite is destroyed by strong acid of a pH of 4 or less, and aluminosilicate sol covers zeolite. Next in step (B), crystal structure of zeolite is not destroyed, but silicon and aluminium atomic groups (ionic groups) are released from defects of zeolite crystal structure and, further, raw materials for zeolite which are confined in zeolite are eluted. These are united with the sol formed in step (A) and existing on the zeolite surface. Although the sol layer is formed in a relatively short time in step (A) using intense acid, it is believed that the sol is formed gently in step (B) using mild acid to thereby elaborate the sol layer formed in step (A), resulting in a nondefective covering layer. If only step (A) is conducted omitting step (B), stability of the finished zeolite is poor. When the synthetic zeolite is heat-dried after step (B), it is believed that the sol dehydrates into xerogel.

The synthetic zeolite of the invention formed in this modified embodiment is very stable in water. When the synthetic zeolite of the invention is dispersed in distilled water at a concentration of 50 g/liter and maintained at 50° C. for 24 hours, preferably 72 hours, the pH of the dispersion water remains in a range of from 5 to 7, preferably from 6.0 to 6.8.

In a second modification of the invention where synthetic zeolite is stabilized by soaking in an acid aqueous liquid, a gel-forming substance is added to the acid aqueous liquid to thereby constructively add semipermeable gel of foreign origin on the synthetic zeolite surface.

Preferred examples of gel-forming inorganic substances used here include aluminosilicate, silicic acid, silicate, aluminate and alumina. More specically, silicic acid, various silicates such as calcium silicate, magnesium silicate, aluminium silicate, potassium silicate, sodium silicate and water glass, aluminate such as sodium aluminate, calcium aluminate and magnesium aluminate, aluminosilicate such as zeolite, feldspar and mica,, and alumina may be named. In the cases of hardly-soluble substances such as zeolite and alumina, these are dissolved by heating in strong acid or strong alkali, and the resultant easily-soluble materials are used. For instance, zeolite is dissolved in concentrated nitric acid and used. Zeolite is soluble in acid of a pH of 2 or less. For aluminosilicate, this is preferably obtained by dissolving zeolite of the same type as zeolite to be treated. Natural silicon compounds such as silica powder, quartz sand, diatomaceous earth and colloidal silica, and other aluminium containing compounds may also be used. Any known inorganic gel-forming substances may be used.

Preferred examples of gel-forming organic substances include natural semipermeable high molecular weight substances such as gelatin, agar, sodium allginate and various cellulose derivaties, and semipermeable synthetic polymers such as PVA derivatives, regenerated cellulose derivatives, acrylic acid derivatives, melamine resin derivatives and phenol resin derivatives.

The aforesaid gel-forming substances effective in the invention may be used alone or in combination with each other.

It is possible to combine small amounts of inorganic polyvalent salts such as calcium nitrate and magnesium nitrate, and organic acid salts such as sodium oxalate and sodium potassium tartrate to thereby obtain more stable synthetic zeolite particles.

In general, these gel-forming substances exist in an amount of 0.001 to 10% by weight, preferably 0.01 to 1% by weight, based on the whole weight of zeolite.

The soaking may be conducted in any manner. For instance, an acid aqueous liquid is placed in a vessel provided with a stirrer, to which a gel-forming substance such as aluminosilicate or its solution is added. Alternatively, a gel-forming substance (hereinafter referred to as additive) is first dissolved in acid and added to distilled water to form a soaking liquid. Then, synthetic zeolite is added little by little under stirring to disperse, wherein the pH of the dispersion liquid will rise and, accordingly, acid is replenished properly to maintain the pH at a predetermined value of 7 or less. An acid solution of an additive such as aluminosilicate may be added. Usually, an additive is combined with a soaking liquid or zeolite in advance (prior addition method), but an additive may be added to a zeolite dispersion later (posterior addition method).

Then the soaking and the heat drying are performed as described above.

It is believed that a xerogel layer is formed on the surface of synthetic zeolite, which is the reason why stable synthetic zeolite is obtained in the process of the invention. That is, sols and gels precipitate on the surface of zeolite during the soaking and, upon heat drying, the sols dehydrate into xerogel. It has been known that when acid is added to silicate, silicic acid is isolated in a sol state, which becomes silicate gel upon aggregation. Sol and gel of alumina are also known. Some of these xerogel are commercially available as desicating agents or adsorbents.

It is believed that the sol layer becomes more homogeneous during the prolonged soaking with an acid soaking liquid. That is, silicon and aluminium atomic groups are released from defects of zeolite crystal structure by the action of acid and, further, raw materials for zeolite which are confined in zeolite are eluted. These are combined with a sol added from the outside. Through such slow formation of sol, a sol layer is deliberated more and more, resulting in a nondefective covering layer. If this soaking treatment is omitted, the stability of the resultant synthetic zeolite is poor.

The synthetic zeolite of the invention formed in this second modified embodiment is very stable in water. When the synthetic zeolite of the invention is dispersed in distilled water at a concentration of 50 g/liter and maintained at 30° to 40° C. for 24 hours, preferably 72 hours, the pH of the dispersion water remains in a range of from 5 to 7, preferably from 6.0 to 6.8. Particularly, in the case where the same zeolite as that to be treated or high molecular weight substances such as cellulose derivatives and acrylic acid derivatives are used as a gel-forming substance in the soaking, after the resultant synthetic zeolite is dispersed in water at a concentration of 50 g/liter and maintained at 80° C. for 24 hours, preferably 72 hours, the pH of the dispersion water remains in a range of from 5 to 7, preferably from 6.0 to 6.8.

The synthetic zeolite of the intention stably holds a neutral or very weakly acid property. Even when it is wetted, its pH does not rise, but remains stable. Accordingly, it shows low stimulation on contacting mucosae or skins and exhibits no adverse effects. Thus, it may be used as a raw material or gredient in medicines, medical instruments, cosmetics and foods. When it is mixed or incorporated in various organic or inorganic materials, it is stable in structure for a long period of time and, accordingly, does not cause deterioration of physical properties or characteristics of the materials. The present invention may be applied to all of the conventional types of synthetic zeolite which are modified by ion-exchange for particular usage. The synthetic zeolite of the invention mostly have substantially the same functions as those of conventional synthetic zeolite, and may be used as desicating agents, adsorbents, ion exchanger, various additives, catalysts, separators such as molecular sieves, pellets for water treatment or carriers.

Zeolite on which metal ion, particularly silver ion, is supported at the same time with the soaking according to the invention has extremely superior light resistance, compared to zeolite on which silver ion is supported in a conventional manner. Products having a less amount of supported metal ion than the ion exchange capacity of zeolite may be suitable for antibacterial use. Products having almost the same amount of metal ion as the ion exchange capacity may be suitable to be used as molecular sieves in pressure swing adsorption and chromatography packing materials.

The synthetic zeolite of the invention maintains its functions when pelletized by various pelletizers.

Use of the synthetic zeolite of the invention by mixing it in organic polymers will be specifically explained below. It is known that antibacterial metal ions are supported on zeolite, and polymers are mixed with the zeolite and shaped (U.S. Pat. No. 4,775,585). As the synthetic zeolite of the invention is neutral or very weakly acid, it does not cause degradation of polymers. Polymers used herein are, for instance, synthetic or semisynthetic organic polymers, more specifically, thermoplastic synthetic polymers such as polyethylene, polypropylene, polystyrene, polyvinyliden chloride, polyamide, polyester, polyvinyl alcohol, polycarbonate, polyacetal, ABS resins, acrylic resins, fluororesins, polyurethane elastomers and polyester elastomers, thermosetting synthetic polymers such as phenol resins, urea resins, melamine resins, unsaturated polyester resins, epoxy resins and urethane resins, and regenerated or semisynthetic polymers such as rayon, cupra, acetate and triacetate. By incorporating the synthetic zeolite into polymers, it is possible to obtain shaped polymer articles, including coating and adhesives, which has functions of (modified) zeolite such as adsorption, drying and antibacterial properties. Further, the synthetic zeolite of the invention may be used as additives in industrial materials which require pH stability, such as paints and adhesives. Difference between the synthetic zeolite of the invention and conventional synthetic zeolite previously used is particularily remakable in shaped polymer articles which contain at least 0.01% by weight of synthetic zeolite.

The invention will be described in more detail with reference to the following Examples.

A pH of water in which zeolite is dispersed (hereinafter sometimes referred to as pH of zeolite for brevity) were determined as follows: Synthetic zeolite was dried at 105° C. under normal pressure for 2 hours, cooled to room temperature, dispersed in distilled water at a concentration of 50 g/liter and stirred at 20° to 25° C. or an indicated elevated temperature (hereinafter, holding temperature) for 24 hours under stirring at 500 rpm, allowed to cool to room temperature in the case, and then the pH was measured at 20° C. using guaranteed electrodes.

For determination of elution of aluminium, a dispersion of 50 g/l were stirred at 20° to 25° C. or an indicated elevated temperature (i.e., holding temperature) for 24 hours under stirring at 500 rpm as mentioned above, allowed to cool to room temperature in the case, allowed to stand for 72 hours, and then passed through a 0.45 micron membrane filter to obtain an aliquot of the liquid, which was subjected to atomic absorption spectrophotometry using AA-640-13 Type made by Shimazu Seisakusho Co. The detection limit was 0.5 ppm.

Starting synthetic zeolite used in the Examples is as shown in Table 1. Each synthetic zeolite was, if needed, pulverized and classified to obtain a desired particle size. The water content in the Table 1 is that of zeolite which was dried at 105° C.

TABLE 1

| Type of Zeolite | Composition | Average Particle Size, micron | Water Content, % |
|---|---|---|---|
| (1) A | 0.94Na$_2$O.Al$_2$O$_3$.1.92SiO$_2$.xH$_2$O | 1.1 | 16.0 |
| (2) Y | 0.99Na$_2$O.Al$_2$O$_3$.2.55SiO$_2$.xH$_2$O | 1.6 | 19.8 |
| (3) X | 1.14Na$_2$O.Al$_2$O$_3$.4.90SiO$_2$.xH$_2$O | 0.6 | 12.7 |
| (4) A | Commercial Product, foreign G. Co. | 11.8 | 8.2 |
| (5) A | Commercial Product, foreign E. Co. | 3.4 | 7.1 |
| (6) A | Commercial Product, Japanese M. Co. | 3.8 | 6.6 |
| (7) Y | Commercial Product, foreign G. Co. | 5.8 | 11.2 |
| (8) X | Commercial Product, foreign G. Co. | 3.4 | 11.8 |

Control 1 pH's and eluted aluminium concentrations of the aforesaid zeolites (1) to (8) were determined. The results are as seen in Table 2.

TABLE 2

| Zeolite | pH | Eluted Al Concentration, ppm |
|---|---|---|
| (1) A | 12.2 | 32.2 |
| (2) Y | 10.9 | 12.4 |
| (3) X | 11.0 | 10.1 |
| (4) A | 10.9 | 12.9 |
| (5) A | 11.3 | 11.6 |
| (6) A | 10.4 | 15.5 |
| (7) Y | 11.0 | 7.3 |
| (8) X | 10.8 | 9.5 |

EXAMPLE 1a

From the aforesaid eight types of synthetic zeolite particles, synthetic zeolite of the invention was prepared as follows.

One liter of demineralized water was placed in a two-liter reactor provided with a stirrer and an acid-dropping instrument containing a 10% aqueous nitric acid solution. An initial pH of the demineralized water was adjusted to 4, and 100g of synthetic zeolite solid particles were added little by little to disperse at 30° C. under stirring at 500 rpm. During this process, the pH of the dispersion liquid in the reactor would rise and, therefore, acid was continually added from the acid-dropping instrument to maintain the pH within 5.5±0.3 to thereby control the pH in the reactor continuously. After the addition of the synthetic zeolite particles was completed in about 20 minutes, the pH was further controlled by the addition of acid for additional 2 hours. Then, it was confirmed that the pH remained in a range of 5.5±0.3 for one hour without the addition of acid, and then the acid treatment was ended. After solid-liquid separation with a Buchner filtration unit, the synthetic zeolite was subjected to drying at 130° C. for 4 hours without washing with water to remove water and then pulverized properly into a product using a mortar of the Japanese pharmacopoeia.

The resultant synthetic zeolite of the invention was dispersed in distilled water and subjected to the determination of pH and eluted aluminium concentration. The results are as shown in Table 3a. Stability to water was very good in all of the cases.

TABLE 3a

| Zeolite | pH | Eluted Al Concentration, ppm |
|---|---|---|
| (1) A | 6.7 | below the detection limit |
| (2) Y | 6.5 | " |
| (3) X | 6.4 | " |
| (4) A | 6.5 | " |
| (5) A | 6.6 | " |
| (6) A | 6.3 | " |
| (7) Y | 6.4 | " |
| (8) X | 6.7 | " |

EXAMPLE 1b

From the eight types of synthetic zeolite particles, synthetic zeolite of the invention was prepared as follows, using the same apparatus as in Example 1a.

One liter of demineralized water was placed in a two-liter reactor provided with a stirrer and an acid-dropping instrument containing a 10% aqueous nitric acid solution. An initial pH of the demineralized water was adjusted to 3.8, and 100 g of synthetic zeolite solid particles were added little by little to disperse at 30° C. under stirring at 500 rpm. During this process, the pH of the dispersion liquid in the reactor would rise and, therefore, acid was continually added from the acid dropping instrument to maintain the pH within 5.0±0.3 to thereby control the pH in the reactor continuously. After the addition of the synthetic zeolite particles was completed in about 20 minutes, the pH was further controlled by the addition of acid for additional 2 hours. Then, it was confirmed that the pH remained in a range of 5.0±0.3 for one hour without the addition of acid, and then the acid treatment was ended. After solid-liquid separation with a Buchner filtration unit, 3 liters of a washing liquid prepared by adding a 10% aqueous nitric acid solution to demineralized water to adjust the pH to 3.8 was poured to the separated zeolite in the Buchner filtration unit to thereby wash the zeolite. The pH of the washing liquid at the end of the washing was about 5. Then the synthetic zeolite was subjected to drying at 130° C. for 4 hours to remove water and then pulverized properly into a product using a mortar of the Japanese pharmacopoeia.

The resultant synthetic zeolite of the invention was dispersed in distilled water and subjected to the determination of pH and eluted aluminium concentration. The results are as shown in Table 3b. Stability to water was very good in all of the cases.

TABLE 3b

| Zeolite | pH | Eluted Al Concentration, ppm |
|---|---|---|
| (1) A | 6.6 | below the detection limit |
| (2) Y | 6.4 | " |
| (3) X | 6.4 | " |
| (4) A | 6.3 | " |
| (5) A | 6.4 | " |
| (6) A | 6.3 | " |
| (7) Y | 6.3 | " |
| (8) X | 6.6 | " |

EXAMPLE 2a

From conventional zeolite (4), (7) and (8), synthetic zeolite of the invention was prepared. The reaction apparatus used was the same as that used in Example 1a. The used acid was, however, a 10% aqueous acetic acid solution.

One liter of demineralized water was placed in the reactor. An initial pH of the demineralized water was adjusted to 5, and 100 g of synthetic zeolite solid particles were added little by little to disperse at 25° C. under stirring at 500 rpm. During this process, the pH of the dispersion liquid in the reactor would rise and, therefore, acid was continually added to maintain the pH within 6.3±0.3 to thereby control the pH in the reactor continuously. After the addition of the synthetic zeolite particles was completed in about 20 minutes, the pH was further controlled by the addition of acid for additional 7 hours. Then, it was confirmed that the pH remained in a range of 6.3±0.3 for one hour without the addition of acid, an then the acid treatment was ended. After solid-liquid separation with a Buchner filtration unit, the synthetic zeolite was subjected to drying at 130° C. for 4 hours without washing with water to remove water and then pulverized properly into a product using a mortar of the Japanese pharmacopoeia.

The resultant synthetic zeolite of the invention was dispersed in distilled water and subjected to the determination of pH and eluted aluminium concentration. The results are as shown in Table 4a. Stability to water was very good.

TABLE 4a

| Zeolite | pH | Eluted Al Concentration, ppm |
|---|---|---|
| (4) A | 6.9 | below the detection limit |
| (7) Y | 6.6 | " |
| (8) X | 6.4 | " |

EXAMPLE 2b

From conventional zeolite (4), (7) and (8), synthetic zeolite of the invention was prepared. The reaction apparatus used was the same as that used in Example 1a. The used acid was, however, a 10% aqueous acetic acid solution.

One liter of demineralized water was placed in the reactor. An initial pH of the demineralized water was adjusted to 4.0, and 100 g of synthetic zeolite solid particles were added little by little to disperse at 25° C. under stirring at 500 rpm. During this process, the pH of the dispersion liquid in the reactor would rise and, therefore, acid was continually added from the acid dropping instrument to maintain the pH within 5.8±0.3 to thereby control the pH in the reactor continuously. After the addition of the synthetic zeolite particles was completed in about 20 minutes, the pH was further controlled by the addition of acid for additional 7 hours. Then, it was confirmed that the pH remained in a range of 5.8±0.3 for one hour without the addition of acid, and then the acid treatment was ended. After solid-liquid separation with a Buchner filtration unit, the separated synthetic zeolite was dispersed in 3 liters of a washing liquid prepared by adding 10% aqueous nitric acid to demineralized water to adjust the pH to 3.8 and stirred for 30 minutes to thereby wash the zeolite sufficiently. The pH of the washing liquid at the end of the washing was about 5.5. The zeolite was again separated with a Buchner filtration unit and dried at 130° C. for 4 hours to remove water and then pulverized properly into a product using a mortar of the Japanese pharmacopoeia.

The resultant synthetic zeolite of the invention was dispersed in distilled water and subjected to the determination of pH and eluted aluminium concentration. The results are as shown in Table 4b. Stability to water was very good.

TABLE 4b

| Zeolite | pH | Eluted Al Concentration, ppm |
|---|---|---|
| (4) A | 6.6 | below the detection limit |
| (7) Y | 6.5 | " |
| (8) X | 6.4 | " |

EXAMPLE 2c

Using nitric acid and acetic acid, change of pH of zeolite dispersion was traced.

Two vessels with stirrers were prepared. To each of them, 130 m liters of demineralized water were placed, and each 60 g of zeolite A (5) were dispersed therein under stirring at 500 rpm. Then, to each dispersion 2N (126 g/l) nitric acid or 2N (120 g/l) acetic acid was added under stirring at 500 rpm at intervals of 5 minutes in an amount of 1.0 ml per incidence; 5.0 ml per incidence after 10.0 ml were added in total; and 10 ml per incidence after 50.0 ml were added in total. In every occasion, the pH of the dispersion liquid was determined immediately before the next addition of acid. The results are as shown in FIG. 1. It may be seen that the pH of the zeolite dispersion liquid became approximately constant more quickly with acetic acid, compared to nitric acid of the same normal. Bubbling was found around pH 6.5 in both dispersions. Violent bubbling continued from pH 6.8 to about 5.1 with nitric acid, but bubbling was a little with acetic acid. Further, the dispersion liquid became so thick around pH 9, so that the stirrer stopped momentarily with nitric acid, but such thickening was not found with the use of acetic acid.

COMPARISON EXAMPLE 1

Synthetic zeolite (4), (7) and (8) as used in Examples 2a and 2b were subjected to washing with water or neutralization in the following manner.

Washing With Water

A hundred (100) g of synthetic zeolite particles were added to 1 liter of demineralized water and dispersed with sufficient stirring, followed by solid-liquid separation with a Buchner filtration unit. Further, several aliquots of 3 liters of demineralized water were poured with care into the filtration unit from above, and it was confirmed that the pH of the filtrate was approximately 7. The washed zeolite was taken out, dried at 130° C. for 4 hours and pulverized properly.

Neutralization

A hundred (100) g of synthetic zeolite particles were added to 1 liter of demineralized water and dispersed with sufficient stirring, followed by filtration with a Buchner filtration unit. Then, diluted nitric acid was poured with care for neutralization. After the pH of the neutralizing water was confirmed to be approximately 6.5 for 5 minutes, the neutralization was ended. The neutralized zeolite particles were taken out, dried at 130° C. for 4 hours and pulverized properly.

The resultant zeolite was dispersed in distilled water to determine the pH and eluted aluminium concentration. The results are as shown in Table 5. Almost no improvement was made on the pH values, which were almost unstable, compared to Tables 2a and 2b. Probably as a result of the above, elution of aluminium was at a similar level as before the treatment, and the situation was recognized as auto-destruction. That is, even though the pH was adjusted to about 7 by washing with water or neutralization, the pH became around 10 when dispersed in water later.

TABLE 5

| Zeolite | Treatment | pH | Eluted Al Conc., ppm |
|---|---|---|---|
| (4) A | Washing | 9.4 | 9.1 |
| (7) Y | Washing | 9.5 | 5.4 |
| (8) X | Washing | 9.2 | 7.2 |
| (4) A | Neutralization | 9.0 | 8.1 |
| (7) Y | Neutralization | 9.3 | 5.4 |
| (8) X | Neutralization | 8.9 | 6.8 |

EXAMPLE 3a

In this example, silver ion was given to synthetic zeolite particles (1) through ion exchange. Then synthetic zeolite of the invention was prepared from this zeolite-Ag. The same reaction apparatus as in Example 1 was used with the exception that the reaction vessel was further provided with a silver nitrate-dropping instrument.

Two hundred (200) g of zeolite A(1) were placed in the reactor, in which 1 liter of a 0.5% aqueous silver nitrate solution was added from the dropping instrument and, then, stirred and mixed at a temperature of 30° C. and a stirring speed of 500 rpm for 5 hours to perform ion exchange reaction to thereby form silver-exchanged zeolite. Next, excess silver nitrate was removed by filtration and washing with water, while confirming that the neutral pH was attained, followed by drying and pulverization.

A hundred (100) g, i.e. approximately one half, of the above zeolite-Ag were subjected to the process of the invention. One liter of demineralized water was placed in the same reactor and adjusted to pH 4 with 10% nitric acid, to which 100 g of the zeolite-Ag were added little by little to disperse at 30° C. under stirring at 500 rpm.

During this process, the pH of the dispersion liquid would rise and, therefore, acid was continually added to maintain the pH within 6.0±0.3 to thereby control the pH in the reactor continuously. After the dispersion was completed in about 20 minutes, the pH was further controlled by the addition of acid for additional 3 hours. Then, it was confirmed that the pH remained in a range of 6.0±0.3 for one hour without the addition of acid, and then the reaction was ended.

After solid-liquid separation with a Buchner filtration unit, the zeolite-Ag was subjected to drying at 130° C. for 4 hours without washing with water to remove water and then pulverized properly into a product using a mortar of the Japanese pharmacopoeia.

The obtained synthetic zeolite-Ag of the invention and the non-soaked one were subjected to the determination of pH and eluted aluminium concentration. The results are as shown in Table 6.

Difference in stability to water is apparent between these. The zeolite-Ag of the invention had a neutral and stable pH with no alminium elution, and is a stable product with no auto-destruction being recognized.

Besides, in another embodiment, zeolite was ion-exchanged with the use of silver nitrate while maintaining the pH of the ion-exchanging liquid at 5 with nitric acid, and then filtered and dried without washing by water. This synthetic zeolite according to the invention showed a pH of 6.5.

EXAMPLE 3b

A hundred (100) g of zeolite-Ag prepared in the same manner as in Example 3a were subjected to the following procedure. One liter of demineralized water was placed in the same reactor as used in Example 1a and adjusted to pH 3.8 with 10% nitric acid, to which 100 g of the zeolite-Ag were added little by little to disperse at 30° C. under stirring at 500 rpm.

During this process, the pH of the dispersion liquid would rise and, therefore, acid was continually added to maintain the pH within 5.5±0.3 to thereby control the pH in the reactor continuously. After the dispersion was completed in about 20 minutes, the pH was further controlled by the addition of acid for additional 3 hours. Then, it was confirmed that the pH remained in a range of 6.0±0.3 for one hour without the addition of acid, and then the reaction was ended.

The zeolite was separated with a Buchner filtration unit, dispersed in 0.3 liter of demineralized water and stirred to wash at room temperature for 5 minutes. The pH of the dispersion liquid at the end of the washing was 6.3.

After solid-liquid separation with a Buchner filtration unit, the zeolite-Ag was subjected to drying at 130° C. for 4 hours without washing with water to remove water and then pulverized properly into a product using a mortar of the Japanese pharmacopoeia.

The obtained synthetic zeolite-Ag of the invention was subjected to the determination of pH and eluted aluminium concentration. The results are as shown in Table 6.

The zeolite-Ag of the invention had a neutral and stable pH with no alminium elution, and is a stable product with no auto-destruction being recognized.

Besides, in another embodiment, zeolite was ion-exchanged with the use of silver nitrate while maintaining the pH of the ion-exchanging liquid at 5 with nitric acid, separated from the liquid with a Buchner filtration unit and then treated as stated above. This synthetic zeolite according to the invention showed a pH of 6.8.

TABLE 6

| Zeolite | Manner | pH | Eluted Al Conc., ppm |
|---|---|---|---|
| (1) A-Ag | Control | 9.5 | 15.6 |
| (1) A-Ag | Example 5a | 6.9 | below the detection limit |
| (1) A-Ag | Example 5b | 6.8 | below the detection limit |

COMPARISON EXAMPLE 2

Zeolite-Ag was prepared in the same manner as in Example 3a. Then, 100 g, i.e. about one half, of the zeolite-Ag were used in an experiment where washing with water was fully conducted after the soaking process.

Zeolite-Ag was subjected to the soaking process where it was confirmed that the pH remained at 5.5±0.5 without addition of acid, and separated from the liquid with a Buchner filtration unit. It was then dispersed in 3.0 liters of demineralized water and stirred to wash at room temperature for 30 minutes. The pH of the washing liquid at the end of the washing was 6.9.

The zeolite-Ag was again separated with a Buchner filtration unit, dried at 130° C. for 4 hours to remove water and pulverized into a product.

The obtained zeolite-Ag showed alkalinity of pH 8.3.

The remaining half of the zeolite-Ag was soaked similarly and separated from the liquid with a Buchner filtration unit. Then, the same procedure as above was performed with the exception that 3.0 liters of demineralized water were gradually poured from above to wash. The pH of the last 1 liter of the demineralized water in the washing process was 7.1. The obtained zeolite-Ag showed alkalinity of pH 8.1.

EXAMPLE 4

Synthetic zeolite of the invention was prepared by incorporating the process of the invention into usual procedure for the preparation of synthetic zeolite. Reaction apparatus used was the same as in Example 3. Raw materials for zeolites were all commercial products of Wako Pure Chemicals Co.

One liter of a 10% aqueous sodium aluminate solution was placed in the reactor, to which 0.9 liter of a 10% aqueous sodium silicate was gradually added from a dropping-instrument over one hour at 60° C. under stirring at 1,000 rpm. The above temperature and stirring speed were maintained over the above period and an additional one hour after the completion of the addition. Then, the temperature in the reactor was raised to 85° C. with simultaneous decrease of a stirring speed to 500 rpm, and ripening reaction was conducted for 8 hours to form synthetic zeolite particles. After cooled, the synthetic zeolite was taken out from the reactor, wherein the whole amount of 1.9 liters of the dispersion containing the reaction product were divided into two aliquots: (A) one was treated in a conventional manner; and (B) the other was processed according to the invention. That is, in (A), solid-liquid separation was carried out with a Buchner filtration unit, and sufficient washing was performed by pouring portionwise. a large amount of demineralized water to remove unreacted materials and perform excessive rinsing. After it was confirmed that the filtrate became approximately neutral, the washing was stopped. Then, the synthetic zeolite was dried at 130° C. for 4 hours and pulverized properly into a product. In (B) on the other hand, solid-liquid separation was carried out with a Buchner filtration unit and washing water was added from above to remove unreacted materials. Then, the residual solid was made a slurry with a small amount of demineralized water, and added little by little into 1 liter of demineralized water (adjusted to pH 4 with nitric acid) prepared in a reactor and subjected to the operation of the invention. The reaction conditions included the use of 10% nitric acid, room temperature, stirring speed of 500 rpm and maintained pH of 5.5±0.3. After the completion of addition of the zeolite, the pH was controlled with the addition of acid for further 2 hours, and then it was confirmed that the pH remained at the aforesaid value for 1 hour without the addition of acid. After solid-liquid separation with a Buchner filtration unit, the synthetic zeolite was dried at 130° C. for 4 hours and pulverized properly.

The pH and eluted aluminium concentration of the obtained zeolite were determined. The results are as shown in Table 7.

It is apparent that stability of the product of the invention is outstandingly excellent.

TABLE 7

| Method | pH | Eluted Al Conc., ppm |
| --- | --- | --- |
| (A) Conventional | 10.1 | 16.8 |
| (B) Invention | 6.8 | below the detection limit |

EXAMPLE 5

This Example is to illustrate that a manner of washing after soaking of zeolite with acid is critical to the invention. From synthetic zeolite particles (1), (2) and (3), synthetic zeolite of the invention was prepared in the following manner.

One liter of demineralized water was placed in a two-liter reactor provided with a stirrer and an acid-dropping instrument containing a 5% aqueous phosphoric acid solution. An initial pH of the demineralized water was adjusted to 4, to which 100 g of synthetic zeolite were gradually added to disperse at 30° C. and a stirring speed of 500 rpm. During this process, the pH of the dispersion liquid in the reactor would rise and, therefore, acid was continually added from the acid-dropping instrument to maintain the pH within 5.0±0.3 and thereby control the pH in the reactor continuously. After the addition of the synthetic zeolite solid particles was completed in about 30 minutes, the pH was further controlled with the addition of acid for additional 2 hours. Then, it was confirmed that the pH remained in a range of 5.0±0.3 for 1 hour and the process was ended.

After solid-liquid separation with a Buchner filtration unit, the synthetic zeolite was dried at 220° C. for 3 hours to remove water and pulverized properly with a mortar of the Japanese pharmacopoeia.

For reference, after solid-liquid separation with a Buchner filtration unit, the same procedure as above was repeated to treat synthetic zeolite with the exception that 3.0 liters of an aqueous acetic acid adjusted to pH 3.8 were poured little by little from above for washing, wherein the pH of the last 1 liter of the washing liquid in the washing process was about 5, or with the exception that 3.0 liters of demineralized water were poured little by little from above for washing with water.

The pH and eluted aluminium concentration of each synthetic zeolite were determined. The results are as shown in Table 8. The synthetic zeolite accompanied with the washing by water for comparison was unstable to water, while the synthetic zeolite of the invention was apparently stable.

TABLE 8

| Zeolite | Manner | pH | Eluted Al Conc., ppm |
| --- | --- | --- | --- |
| (1) A | No washing | 6.8 | below the detection limit |
| (2) Y | No washing | 6.6 | below the detection limit |
| (3) X | No washing | 6.6 | below the detection limit |
| (1) A | Washing With Acid | 6.7 | below the detection limit |
| (2) Y | Washing With Acid | 6.5 | below the detection limit |
| (3) X | Washing With Acid | 6.6 | below the detection limit |
| (1) A | Washing With Water | 9.1 | 3.6 |
| (2) Y | Washing With Water | 8.6 | 2.7 |
| (3) X | Washing With Water | 8.4 | 2.5 |

EXAMPLE 6

From the aforesaid eight types of synthetic zeolite particles, synthetic zeolite of the invention was prepared as follows.

One liter of demineralized water was placed in a two-liter reactor provided with a stirrer and an acid-dropping instrument containing a 10% aqueous nitric acid solution. An initial pH of the demineralized water was adjusted to 4, and 100 g of synthetic zeolite solid particles were added little by little to disperse at 30° C. under stirring at 500 rpm. During this process, the pH of the dispersion liquid in the reactor would rise and, therefore, acid was continually added from the acid-dropping instrument to maintain the pH within 5.5±0.3 to thereby control the pH in the reactor continuously. The addition of the synthetic zeolite particles was completed in about 20 minutes. Next, under the same pH control, an aqueous solution prepared by dissolving 0.10 mole of copper nitrate trihydrate, $Cu(NO_3)_2 3H_2O$, in 300 ml of demineralized water was added over about 20 minutes. After the completion of the addition of the aqueous copper nitrate solution, the pH was still controlled at 30° C. for further 3 hours with the addition of acid. Then, it was confirmed that the pH remained in a range of 5.5±0.3 for one hour without the addition of acid, and then the ion exchange/soaking treatment was ended. After solid-liquid separation with a Buchner filtration unit, the zeolite particles were dispersed in 3 liters of an aqueous acetic acid solution of a pH of 5.0±0.3 and washed at a stirring speed of 500 rpm at room temperature for 1 hour. During this process, when the pH of the washing liquid seemed to become higher than 5.0±0.3, 10% acetic acid was added to maintain the above pH range. Again after solid-liquid separation with a Buchner filtration unit, the zeolite was subjected to drying at 130° C. for 4 hours without washing with water to remove water and then pulverized properly into a product using a mortar of the Japanese pharmacopoeia.

The ion exchange/soaking liquid at the end of soaking and the washing liquid at the end of washing were all colorless and transparent, in which blue color intrinsic to copper ion was not observed. From this, it was found that almost all of the copper ion was supported on the synthetic zeolite through ion exchange.

The resultant synthetic zeolite of the invention was dispersed in distilled water and subjected to the determination of pH and eluted aluminium concentration. The results are as shown in Table 9. Stability to water was very good in all of the cases.

TABLE 9

| Zeolite | pH | Eluted Al Conc., ppm |
|---|---|---|
| (1) A | 6.6 | below the detection limit |
| (2) Y | 6.3 | " |
| (3) X | 6.2 | " |
| (4) A | 6.3 | " |
| (5) Y | 6.4 | " |
| (6) X | 6.3 | " |
| (7) Y | 6.1 | " |
| (8) X | 6.3 | " |

COMPASSION EXAMPLE 3

The same synthetic zeolite as in Example 6 was subjected to conventional Ion exchange. The same reactor as in Example 6 was used.

In advance of ion exchange, synthetic zeolite was washed with water to remove alkaline components. That is, 100 g of synthetic zeolite were dispersed in 1 liter of demineralized water under stirring. After solid-liquid separation with a Buchner filtration unit, 3 liters of demineralized water were added portionwise from above. The pH of the filtrate was about 7.

The washed synthetic zeolite, weighed 100 g before the washing, was placed in the rector, to which 1 liter of demineralized water was added. Then, an aqueous solution prepared by dissolving 0.10 mole of copper nitrate trihydrate in 300 ml of demineralized water was added over about 20 minutes. After the completion of the addition of the aqueous copper nitrate solution, the stirring was continued at 30° C. for further 3 hours.

After solid-liquid separation with a Buchner filtration unit, the zeolite particles were dispersed to wash in 3 liters of demineralized water. Again after solid-liquid separation with a Buchner filtration unit, the zeolite was sufficiently washed by pouring 1 liter of demineralized water from above and then dried at 130° C. for 4 hours to remove water and pulverized properly into a product using a mortar of the Japanese pharmacopoeia.

The soaking liquid at the end of ion exchange and the washing liquid of the zeolite were all colorless and transparent. From this, it was found that almost all of the copper ion was supported on the synthetic zeolite.

The resultant synthetic zeolite particles were dispersed in distilled water and subjected to the determination of pH and eluted aluminium concentration. The results are as shown in Table 10. Although the starting synthetic zeolite was washed in advance, the pH was alkaline and aluminium ion was detected.

TABLE 10

| Zeolite | pH | Eluted Al Conc., ppm |
|---|---|---|
| (1) A | 9.6 | 14.0 |
| (2) Y | 8.9 | 8.2 |
| (3) X | 9.2 | 6.6 |
| (4) A | 9.0 | 6.1 |
| (5) Y | 9.5 | 9.0 |
| (6) X | 9.8 | 11.6 |
| (7) Y | 9.6 | 4.3 |
| (8) X | 9.4 | 7.3 |

EXAMPLE 7

From the conventional synthetic zeolite (1) to (5), synthetic zeolite of the invention was prepared as follows. The same reaction apparatus as in Example 6 was used with the exception that the used acid was a 10% aqueous acetic acid.

One liter of demineralized water was placed in the reactor. An initial pH of the demineralized water was adjusted to 5, and 100 g of synthetic zeolite solid particles were added little by little to disperse at 25° C. under stirring at 500 rpm. During this process, the pH of the dispersion liquid in the reactor would rise and, therefore, acid was continually added to maintain the pH within 6.3±0.3 to thereby control the pH in the reactor continuously. The addition of the synthetic zeolite particles was completed in about 20 minutes. Next, under the same pH control, an aqueous solution prepared by dissolving 0.25 mole of silver nitrate and 0.10 mole of copper nitrate trihydrate in 300 ml of demineralized water was added over about 20 minutes. After the completion of the addition of the aqueous silver nitrate and copper nitrate solution, the pH was still controlled at 25° C. for further 7 hours with the addition of acid. Then, it was confirmed that the pH remained in a range of 6.3±0.3 for one hour without the addition of acid, and then the treatment was ended.

After solid-liquid separation with a Buchner filtration unit, the zeolite particles were dispersed in 3 liters of an aqueous acetic acid solution of a pH of 5.8±0.3 and washed at a stirring speed of 500 rpm at room temperature for 1 hour. During this process, when the pH of the washing liquid seemed to become higher than 5.8±0.3, 10% acetic acid was added to maintain the above pH range. Again after solid-liquid separation with a Buchner filtration unit, the zeolite was subjected to drying at 130° C. for 4 hours without washing with water to remove water and then pulverized properly into a product using a mortar of the Japanese pharmacopoeia.

The resultant synthetic zeolite of the invention was dispersed in distilled water and subjected to the determination of pH and eluted aluminium concentration. The results are as shown in Table 11. Stability to water was very good.

TABLE 11

| Zeolite | pH | Eluted Al Conc., ppm |
|---|---|---|
| (1) A | 6.4 | below the detection limit |
| (2) Y | 6.3 | " |
| (3) X | 6.6 | " |
| (4) A | 6.5 | " |
| (5) A | 6.5 | " |

EXAMPLE 8

This example is to illustrate that the method of washing after ion exchange/soaking of zeolite is critical to the invention. Synthetic zeolite particles (1), (2), (3) and (5) were ion-exchanged with silver ion to prepare synthetic zeolite-Ag in the following manner. The same reaction apparatus as in Example 6 was used.

A hundred (100) g of synthetic zeolite were placed in the reactor, to which 1 liter of demineralized water was added and stirred at 30° C. and a stirring speed of 500 rpm for 10 minutes. While adding a 10% aqueous nitric acid solution to maintain the pH in the reactor at 5.5±0.3, an aqueous solution prepared by dissolving 0.25 mole of silver nitrate in 300 ml of demineralized water was added over about 20 minutes. After the completion of the addition of the aqueous silver nitrate solution, the above pH was still maintained at the above temperature for further 5 hours with the addition of acid. Then, it was confirmed that the pH remained in a range of from 5.5±0.3 for one hour without the addition of acid. After solid-liquid separation with a Buchner filtration unit, the zeolite was dispersed and washed in 3 liters of an aqueous acetic acid solution of a pH of 5.0±0.3 under stirring for 30 minutes. During this process, when the pH of the washing liquid seemed to become higher than 5.0±0.3, 10% acetic acid was added to maintain the above pH range. Again after solid-liquid separation with a Buchner filtration unit, the zeolite was subjected to drying at 130° C. for 4 hours without washing with water to remove water and then pulverized properly into a product using a mortar of Japanese pharmacopoeia.

For comparison, the above procedure was repeated with the exception that the washing of zeolite after the ion exchange/soaking was performed by dispersing the zeolite in 3.0 liters of demineralized water under stirring for 30 minutes (Control A).

In addition, Control A was applied to synthetic zeolite which had been washed to remove alkaline components as in Comparison Example 2 (Control B).

The obtained synthetic zeolite-Ag of the invention and those of Controls A and B were subjected to the determination of pH and eluted aluminium concentration. The results are as shown in Table 12.

The zeolite-Ag of the invention was almost neutral and stable and showed no elution of aluminium. Thus, it is a very stable product with no appreciable auto-decomposition.

Each of the synthetic zeolite obtained above was dried at 105° C. for 2 hours, packed in an ring made of aluminium with an inner diameter of 45 mm and pressed at 10 tons by a press unit to prepare a test piece. Then, it was irradiated with carbon arc light in a fadeometer for 40 hours and evaluated for discoloration with a colorimeter (type TC-1,Tokyo Denshoku Industries).

The results are as shown in Table 13. As seen from the table, the synthetic zeolite-Ag of the invention had excellent resistance to light.

TABLE 13

| Zeolite-Ag | Manner | L Before | L After | a Before | a After | b Before | b After | Color Difference in NBS' unit |
|---|---|---|---|---|---|---|---|---|
| (1) A-Ag | Invention | 95.81 | 94.26 | −1.17 | −0.88 | −0.12 | 0.41 | 1.66 |
| A-Ag | Control A | 92.66 | 86.24 | −0.63 | 1.12 | 0.11 | 2.34 | 6.82 |
| A-Ag | Control B | 88.02 | 75.98 | 0.08 | 1.63 | 1.35 | 4.76 | 12.61 |
| (2) Y-Ag | Invention | 94.38 | 92.69 | 0.18 | 0.86 | 0.61 | 1.06 | 1.88 |
| Y-Ag | Control A | 92.79 | 87.03 | 1.06 | 3.19 | 1.07 | 4.52 | 7.04 |
| Y-Ag | Control B | 88.92 | 76.08 | 1.24 | 3.61 | 1.27 | 5.98 | 13.34 |
| (3) X-Ag | Invention | 93.76 | 91.98 | −0.83 | −0.62 | 0.57 | 1.00 | 1.84 |
| X-Ag | Control A | 90.01 | 82.18 | −0.31 | 0.98 | 1.02 | 3.35 | 8.27 |
| X-Ag | Control B | 86.49 | 71.46 | 1.03 | 3.02 | 1.88 | 5.05 | 15.49 |
| (5) A-Ag | Invention | 94.31 | 91.52 | −0.24 | 0.12 | 0.86 | 2.09 | 3.11 |
| A-Ag | Control A | 93.66 | 82.78 | 0.26 | 2.63 | 1.02 | 4.76 | 11.75 |
| A-Ag | Control B | 91.90 | 72.57 | 0.08 | 3.73 | 1.36 | 5.46 | 20.09 |

"Before" and "After" stand for before or after irradiation, respectively.

First Modified Embodiment

In the following Examples, soaking was carried out in two steps (A) and (B).

Control 2 pH's and eluted aluminium concentrations of the aforesaid zeolites (1) to (8) were determined as above, but with the holding temperature of 50° C. The results are as seen in Table 14.

TABLE 14

| Zeolite | pH | Eluted Al Conc., ppm |
|---|---|---|
| (1) A | 12.4 | 46.8 |
| (2) Y | 11.2 | 16.7 |
| (3) X | 11.2 | 14.9 |
| (4) A | 11.3 | 20.3 |
| (5) A | 11.5 | 14.2 |
| (6) A | 11.0 | 18.1 |
| (7) Y | 11.4 | 9.6 |
| (8) X | 11.0 | 12.0 |

EXAMPLE 9

From the aforesaid eight types of synthetic zeolite particles, synthetic zeolite of the invention was prepared as follows.

One liter of demineralized water was placed in a two-liter reactor provided with a stirrer and an acid-dropping instrument containing a 10% aqueous nitric acid solution. An initial pH of the demineralized water was adjusted to 2, and 100 g of synthetic zeolite solid particles were added little by little to disperse at 30° C. under stirring at 500 rpm. During this process, the pH of the dispersion liquid in the reactor would rise and, therefore, acid was continually added from the acid-dropping instrument to maintain the pH within 3.8±0.2 to thereby control the pH in the reactor continuously. After the addition of the synthetic zeolite particles was completed in about 20 minutes, the pH was further controlled in a range of 3.8±0.2, by the addition of acid for additional half an hour. Then, an aqueous sodium hydroxide solution was added to the soaking liquid to

TABLE 12

| Zeolite | Manner | pH | Eluted Al Conc., ppm |
|---|---|---|---|
| (1) A-Ag | Invention | 6.8 | below the detection limit |
| A-Ag | Control A | 9.3 | 12.4 |
| A-Ag | Control B | 9.5 | 15.2 |
| (2) Y-Ag | Invention | 6.6 | below the detection limit |
| Y-Ag | Control A | 9.1 | 7.2 |
| Y-Ag | Control B | 9.3 | 8.1 |
| (3) X-Ag | Invention | 6.4 | below the detection limit |
| X-Ag | Control A | 8.8 | 4.6 |
| X-Ag | Control B | 9.4 | 6.3 |
| (5) A-Ag | Invention | 6.7 | below the detection limit |
| A-Ag | Control A | 9.3 | 9.7 |
| A-Ag | Control B | 9.8 | 11.0 |

Resistance to light of the various synthetic zeolite-Ag obtained above was examined.

The test was conducted with reference to JIS (Japanese Industrial Standard) L-0842 as follows.

adjust its pH to about 5, and it was confirmed that the pH remained in a range of 5.5 or below for one hour without the addition of acid, and then the treatment was ended. After solid-liquid separation with a Buchner filtration unit, the synthetic zeolite was subjected to drying at 130° C. for 4 hours to remove water and then pulverized properly into a product using a mortar of the Japanese pharmacopoeia.

The resultant synthetic zeolite of the invention was dispersed in distilled water(50° C.) and subjected to the determination of pH and eluted aluminium concentration. The results are as shown in Table 15. Stability to water was very good in all of the cases.

TABLE 15

| zeolite | pH | (50° C.) Eluted Al Concentration, ppm |
| --- | --- | --- |
| (1) A | 6.5 | below the detection limit |
| (2) Y | 6.3 | " |
| (3) X | 6.2 | " |
| (4) A | 6.5 | " |
| (5) A | 6.5 | " |
| (6) A | 6.3 | " |
| (7) Y | 6.2 | " |
| (8) X | 6.6 | " |

EXAMPLE 10

From conventional zeolite (4), (7) and (8), synthetic zeolite of the invention was prepared. The reaction apparatus used was the same as that used in Example 9. The used acid was, however, a 10% aqueous phosphoric acid solution.

One liter of demineralized water was placed in the reactor. An initial pH of the demineralized water was adjusted to 2, and 100 g of synthetic zeolite solid particles were added little by little to disperse at 25° C. under stirring at 500 rpm. During this process, the pH of the dispersion liquid in the reactor would rise and, therefore, acid was continually added to maintain the pH within 3.6±0.2 to thereby control the pH in the reactor continuously. After the addition of the synthetic zeolite particles was completed in about 20 minutes, the pH was further controlled in a range of 3.6 ±0.2, by the addition of acid for additional 15 minutes. Then, an aqueous sodium hydroxide solution was added to the soaking liquid to adjust its pH to about 6, and it was confirmed that the pH remained in a range of 6.3 or below for one hour without the addition of acid, and then the acid treatment was ended.

After solid-liquid separation with a Buchner filtration unit, the synthetic zeolite was subjected to drying at 130° C. for 4 hours without washing with water to remove water and then pulverized properly into a product using a mortar of the Japanese pharmacopoeia.

The resultant synthetic zeolite of the invention was dispersed in distilled water (holding temperature 50° C.) and subjected to the determination of pH and eluted aluminium concentration. The results are as shown in Table 16. Stability to water was very good.

TABLE 16

| zeolite | pH | (50° C.) Eluted Al Concentration, ppm |
| --- | --- | --- |
| (4) A | 6.6 | below the detection limit |
| (7) Y | 6.3 | " |
| (8) X | 6.4 | " |

COMPARISON EXAMPLE 3

Comparison Example 1 was repeated with the exception that the holding temperature before the determination of pH and eluted aluminium concentration was 50° C. instead of 20° to 25° C.

The results are as shown in Table 16. The same comments as stated in Comparison Example 1 also apply here in comparison between Tables 14 and 17.

TABLE 17

| Zeolite | (50° C.) Treatment | pH | Eluted Al Conc., ppm |
| --- | --- | --- | --- |
| (4) A | Washing | 9.7 | 14.2 |
| (7) Y | Washing | 9.7 | 7.8 |
| (8) X | Washing | 9.4 | 10.6 |
| (4) A | Neutralization | 9.3 | 12.3 |
| (7) Y | Neutralization | 9.5 | 6.9 |
| (8) X | Neutralization | 9.3 | 9.1 |

EXAMPLE 11

In this example, silver ion was given to synthetic zeolite particles (1) through ion exchange. Then, synthetic zeolite of the invention was prepared from this zeolite-Ag. The same reaction apparatus as in Example 9 was used with the exception that the reaction vessel was further provided with a silver nitrate-dropping instrument.

Two hundred (200) g of zeolite A(1) were placed in the reactor, in which 1 liter of a 0.5% aqueous silver nitrate solution was added from the dropping instrument and, then, stirred and mixed at a temperature of 30° C. and a stirring speed of 500 rpm for 5 hours to perform ion exchange reaction to thereby form silver-exchanged zeolite. Next, excess silver nitrate was removed by filtration and washing with water, while confirming that the neutral pH was attained, followed by drying and pulverization.

A hundred (100) g, i.e. approximately one half, of the above zeolite-Ag were subjected to the process of the invention. One liter of demineralized water was placed in the same reactor and adjusted to pH 3 with 10% nitric acid, to which 100 g of the zeolite-Ag were added little by little to disperse at 30° C. under stirring at 500 rpm.

During this process, the pH of the dispersion liquid would rise and, therefore, acid was continually added to maintain the pH within 3.8±0.2 to thereby control the pH in the reactor continuously. After the addition of the synthetic zeolite particles was completed in about 20 minutes, the pH was further controlled in a range of 3.8±0.2 by the addition of acid for additional 15 minutes. Then, an aqueous sodium hydroxide solution was added to the soaking liquid to adjust its pH to about 6, and it was confirmed that the pH remained in a range of 6.0±0.3 for one hour without the addition of acid, and then the acid treatment was ended.

After solid-liquid separation with a Buchner filtration unit, the synthetic zeolite was subjected to drying at 130° C. for 4 hours without washing with water to remove water and then pulverized properly into a product using a mortar of the Japanese pharmacopoeia.

The obtained synthetic zeolite-Ag of the invention and the non-soaked one were subjected to the determination (50° C.) of pH and eluted aluminium concentration. The results are as shown In Table 18.

Difference in stability to water is apparent between these. The zeolite-Ag of the invention had a neutral and stable pH with no alminium elution, and is a stable product with no auto-destruction being recognized.

TABLE 18

| Zeolite | Manner | (50° C.) pH | Eluted Al Conc., ppm |
|---|---|---|---|
| (1) A-Ag | Control | 9.7 | 16.9 |
| (1) A-Ag | Invention | 6.8 | below the detection limit |

EXAMPLE 12

Synthetic zeolite of the invention was prepared by incorporating the process of the invention into usual procedure for the preparation of synthetic zeolite. Reaction apparatus used was the same as in Example 11. Raw materials for zeolite were all commercial products of Wako Pure Chemicals Co.

One liter of a 10% aqueous sodium aluminate solution was placed in the reactor, to which 0.9 liter of a 10% aqueous sodium silicate was added from a dropping instrument over one hour at 60° C. under stirring at 1,000 rpm. The above temperature and stirring speed were maintained over the above period and an additional one hour after the completion of the addition. Then, the temperature in the reactor was raised to 85° C. with simultaneous decrease of a stirring speed to 500 rpm, and ripening reaction was conducted for 8 hours to form synthetic zeolite particles. After cooled, the synthetic zeolite was taken out from the reactor, wherein the whole amount of 1.9 liters of the dispersion containing the reaction product were divided into two aliquots: (A) one was treated in a conventional manner; and (B) the other was processed according to the invention. That is, in (A), solid-liquid separation was carried out with a Buchner filtration unit, and sufficient washing was performed by pouring portionwise a large amount of demineralized water to remove unreacted materials and perform excessive rinsing. After it was confirmed that the filtrate became approximately neutral, the washing was stopped. Then, the synthetic zeolite was dried at 130° C. for 4 hours and pulverized properly into a product. In (B) on the other hand, solid-liquid separation was carried out with a Buchner filtration unit and washing water was added from above to remove unreacted materials. Then, the residual solid was made a slurry with a small amount of demineralized water, and added little by little into 1 liter of demineralized water (adjusted to pH 2 with nitric acid) prepared in a reactor and subjected to the operation of the invention. The reaction conditions included the use of 10% nitric acid, room temperature, stirring speed of 500 rpm and maintained pH of $3.8\pm0.2$. After the completion of addition of the zeolite, the pH was controlled within a range of $3.8\pm0.2$ with the addition of acid for further 15 minutes, and then the pH was set to about 5.5 with addition of sodium hydroxide, and it was confirmed that the pH remained at 6 or below without the addition of acid for one hour. After solid-liquid separation with a Buchner filtration unit (with no washing), the synthetic zeolite was dried at 130° C. for 4 hours and pulverized properly.

The pH and eluted aluminium concentration of the obtained zeolite were determined with the holding temperature of 50° C. The results are as shown in Table 19.

It is apparent that stability of the product of the invention is outstandingly excellent.

TABLE 19

| Method | (50° C.) pH | Eluted Al Conc., ppm |
|---|---|---|
| (A) Conventional | 10.3 | 18.2 |
| (B) Invention | 6.6 | below the detection limit |

EXAMPLE 13

This Example is to illustrate that a manner of washing after soaking of zeolite with acid is critical to the invention. From synthetic zeolite particles (1), (2) and (3), synthetic zeolite of the invention was prepared in the following manner.

One liter of demineralized water was placed in a two-liter reactor provided with a stirrer and an acid-dropping instrument containing a 5% aqueous phosphoric acid solution. An initial pH of the demineralized water was adjusted to 2, to which 100 g of synthetic zeolite were gradually added to disperse at 30° C. and a stirring speed of 500 rpm. During this process, the pH of the dispersion liquid in the reactor would rise and, therefore, acid was continually added from the acid dropping instrument to maintain the pH within $3.7\pm0.2$ and thereby control the pH in the reactor continuously. After the addition of the synthetic zeolite solid particles was completed in about 30 minutes, the pH was further controlled with the addition of acid for additional 10 minutes. Then, the pH was set to about 4.5 with the addition of an aqueous sodium hydroxide solution, and it was confirmed that the pH remained in a range of 5.0 or below for 1 hour and the process was ended.

After solid-liquid separation with a Buchner filtration unit, the synthetic zeolite was dried at 220° C. for 3 hours to remove water and pulverized properly with a mortar of the Japanese pharmacopoeia.

As another embodiment, after solid-liquid separation with a Buchner filtration unit, the same procedure as above was repeated with the exception that 3.0 liters of an aqueous acetic acid adjusted to pH 3.8 were poured little by little from above for washing, wherein the pH of the last 1 liter of the washing liquid in the washing process was about 5.

For comparison, the above procedure was repeated with the exception that 3.0 liters of demineralized water were poured little by little from above for washing with water.

The pH and eluted aluminium concentration of each synthetic zeolite were determined with the holding temperature of 50° C. The results are as shown in Table 20. The synthetic zeolite accompanied with the washing by water for comparison was unstable to water, while the synthetic zeolite of the invention was apparently stable.

TABLE 20

| Zeolite | Manner | (50° C.) pH | Eluted Al Conc., ppm |
|---|---|---|---|
| (1) A | Not Washed | 6.6 | below the detection limit |
| (2) Y | Not Washed | 6.5 | below the detection limit |
| (3) X | Not Washed | 6.5 | below the detection limit |
| (1) A | Washing With Acid | 6.5 | below the detection limit |
| (2) Y | Washing With Acid | 6.5 | below the detection limit |
| (3) X | Washing With Acid | 6.4 | below the detection limit |
| (1) A | Washing With Water | 9.3 | 6.8 |
| (2) Y | Washing With Water | 8.9 | 3.4 |
| (3) X | Washing With Water | 8.6 | 3.3 |

Second Modified Embodiment

In the following Examples, a gel-forming substance was added to a soaking liquid.

Controls pH's and eluted aluminium concentrations of the aforesaid zeolite (1) to (8) were determined as described above with the holding temperature of 80° C. The results are as seen in Table 21.

TABLE 21

| Zeolite | pH (80° C.) | Eluted Al Concentration, ppm |
|---|---|---|
| (1) A | 12.7 | 50.1 |
| (2) Y | 11.6 | 21.5 |
| (3) X | 11.5 | 20.7 |
| (4) A | 11.5 | 23.6 |
| (5) A | 11.8 | 18.2 |
| (6) A | 11.6 | 22.0 |
| (7) Y | 11.8 | 12.9 |
| (8) X | 11.4 | 16.2 |

EXAMPLE 14

Synthetic zeolite of the invention was prepared by dissolving the aforesaid eight types of synthetic zeolite particles and adding it to an acid treatment liquid, in which each corresponding synthetic zeolite was soaked.

One liter of demineralized water was placed in a two-liter reactor provided with a stirrer and an acid-dropping instrument containing a 10% aqueous nitric acid solution. Separately, 3 to 8 g of concentrated nitric acid were added to 1 g of synthetic zeolite and, if needed, heated to thereby prepare a viscous zeolite solution. After adding this synthetic zeolite solution to the aforesaid demineralized water, 100 g of synthetic zeolite solid particles were added little by little to disperse at 30° C. under stirring at 500 rpm. During this process, the pH of the dispersion liquid in the reactor would rise and, therefore, acid was continually added from the acid-dropping instrument to maintain the pH within 5.5±0.3 to thereby control the pH in the reactor continuously. After the addition of the synthetic zeolite particles was completed in about 20 minutes, the pH was further controlled by the addition of acid for additional half an hour. Then, it was confirmed that the pH remained in a range of 5.5 or below for one hour without the addition of acid, and then the acid treatment was ended. The zeolite dissolved in acid and added in this process corresponded to each synthetic zeolite dispersed in the soaking liquid.

After solid-liquid separation with a Buchner filtration unit, the synthetic zeolite was subjected to drying at 130° C. for 4 hours without washing with water to remove water and then pulverized properly into a product using a mortar of the Japanese pharmacopoeia.

The resultant synthetic zeolite of the invention was dispersed in distilled water and subjected to the determination of pH and eluted aluminium concentration with a holding temperature of 80° C. The results are as shown in Table 22. Stability to water was very good in all of the cases.

TABLE 22

| Zeolite | pH (80° C.) | Eluted Al Conc., ppm |
|---|---|---|
| (1) A | 6.5 | below the detection limit |
| (2) Y | 6.3 | " |
| (3) X | 6.1 | " |
| (4) A | 6.5 | " |
| (5) A | 6.4 | " |
| (6) A | 6.2 | " |
| (7) Y | 6.3 | " |
| (8) X | 6.1 | " |

Figure 2:
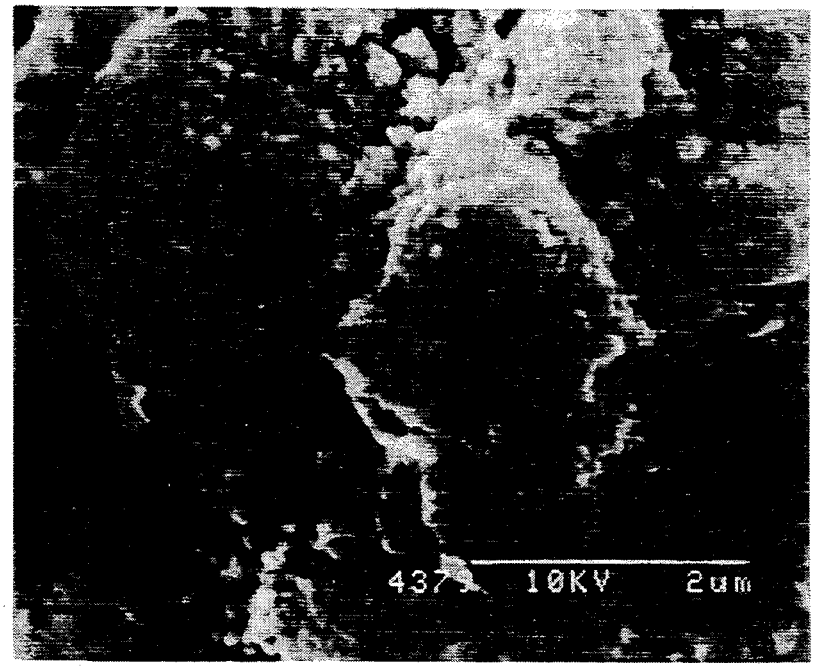
FIGS. 2 to 7 are electron microscopic photographs of zeolite particles. Among them.
Figure 3:
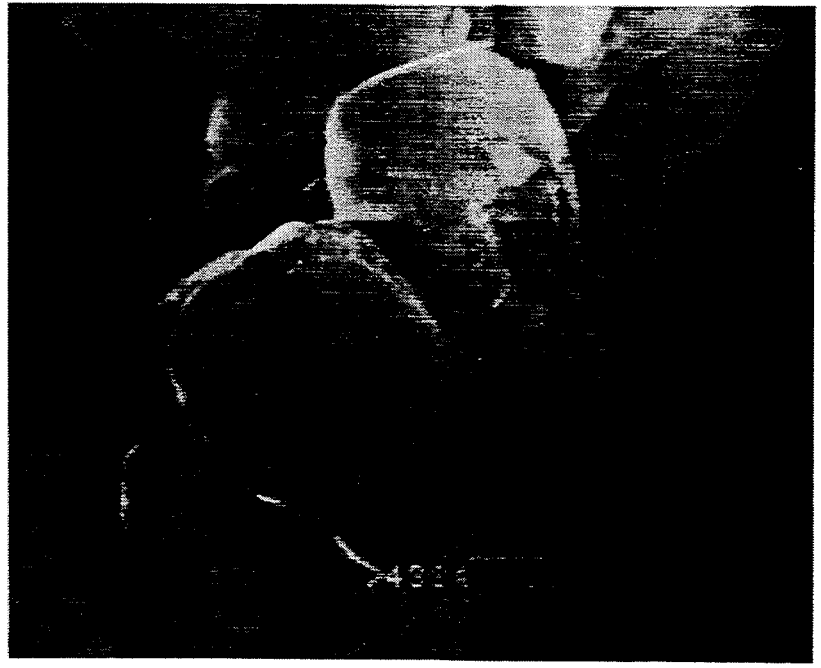
Figure 4:
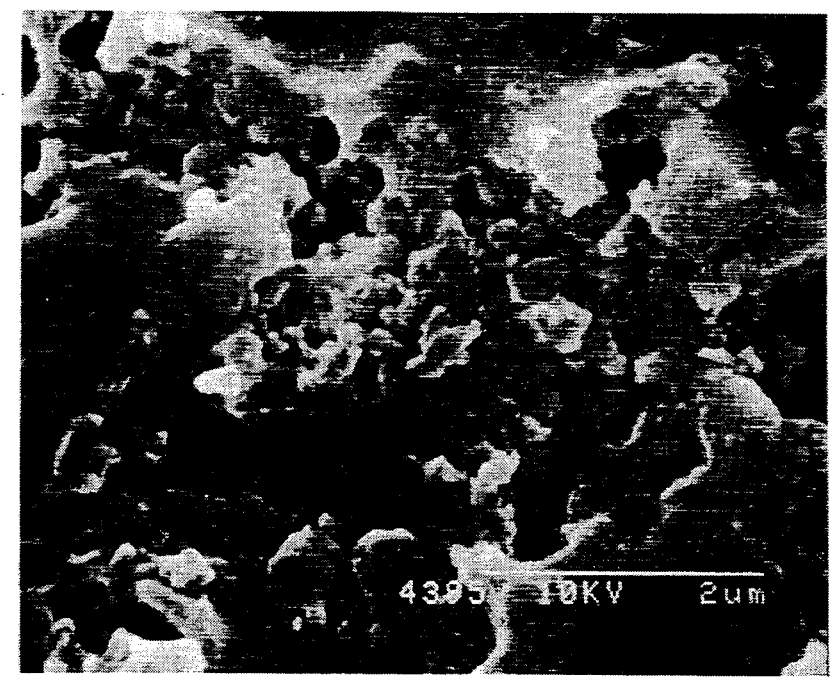

FIG. 2 is an electron microscopic photograph (x 20,000) of synthetic zeolite (5) of the invention. For comparison, FIG. 3 is that (x 20,000) of synthetic zeolite (5) which was not treated by the process of the invention. It is seen that the surface the synthetic zeolite of the invention is covered. The aforesaid solution of synthetic zeolite (5) in concentrated nitric acid was coated on a slide glass and dried, of which electron microscopic photograph (x 20,000) is shown in FIG. 4.

EXAMPLE 15

From conventional zeolite (4), (7) and (8), synthetic zeolite of the invention was prepared. The reaction apparatus used was the same as that used in Example 14. The used acid was, however, a 10% aqueous acetic acid solution.

One liter of demineralized water was placed in the reactor. Separately, about 1 g of concentrated nitric acid was added to 0.2 of synthetic zeolite and warmed to thereby prepare a viscous synthetic zeolite solution. This synthetic zeolite solution was added together with a small amount of water, and 100 g of corresponding synthetic zeolite solid particles were added little by little to disperse at 25° C. under stirring at 500 rpm. During this process, the pH of the dispersion liquid in the reactor would rise and, therefore, acid was continually added to maintain the pH within 8.3±0.3 to thereby control the pH in the reactor continuously. After the addition of the synthetic zeolite particles was completed in about 20 minutes, the pH was further controlled by the addition of acid for additional 7 hours. Then, it was confirmed that the pH remained in a range of 6.3±0.3 for one hour without the addition of acid, and then the acid treatment was ended.

After solid-liquid separation with a Buchner filtration unit, the synthetic zeolite was subjected to drying at 130° C. for 4 hours without washing with water to remove water and then pulverized properly into a product using a mortar of the Japanese pharmacopoeia.

The resultant synthetic zeolite of the invention was dispersed in distilled water and subjected to the determination of pH and eluted aluminium concentration with a holding temperature of 80° C. The results are as shown in Table 23. Stability to water was very good.

TABLE 23

| Zeolite | pH (80° C.) | Eluted Al Conc., ppm |
|---|---|---|
| (4) A | 6.4 | below the detection limit |
| (7) Y | 6.4 | " |
| (8) X | 6.2 | " |

COMPARISON EXAMPLE 4

Comparison Example 1 was repeated with the exception that a holding temperature before the determination of pH and eluted aluminium concentration was 80° C. instead of 20° to 25° C.

The results are as shown in Table 24. The same comments as stated in Comparison Example 1 also apply here in comparison between Tables 21 and 24.

TABLE 24

| Zeolite | Treatment | (80° C.) pH | Eluted Al Conc., ppm |
|---|---|---|---|
| (4) A | Washing | 10.2 | 14.1 |
| (7) Y | Washing | 10.4 | 7.4 |
| (8) X | Washing | 9.5 | 9.9 |
| (4) A | Neutralization | 9.9 | 12.8 |
| (7) Y | Neutralization | 10.1 | 8.0 |
| (8) X | Neutralization | 9.4 | 8.6 |

EXAMPLE 16

In this example, silver ion was given to synthetic zeolite particles (1) through ion exchange. Then synthetic zeolite of the invention was prepared from this zeolite-Ag. The same reaction apparatus as in Example 14 was used with the exception that the reaction vessel was further provided with a silver nitrate-dropping instrument.

Two hundred (200) g of zeolite A(1) were placed in the reactor, in which 1 liter of a 0.5% aqueous silver nitrate solution was added from the dropping instrument and, then, stirred and mixed at a temperature of 30° C. and a stirring speed of 500 rpm for 5 hours to perform ion exchange reaction to thereby form silver-exchanged zeolite. Next, excess silver nitrate was removed by filtration and washing with water, while confirming that the neutral pH was attained, followed by drying and pulverization.

A hundred (100) g, i.e. approximately one half, of the above zeolite-Ag were subjected to the process of the invention. One liter of demineralized water was placed in the same reactor and a solution prepared by dissolving 0.1 g of synthetic zeolite (1) in a small amount of concentrated nitric acid was added together with a small amount of water, to which 100 g of the zeolite-Ag were added little by little to disperse at 30° C. under stirring at 500 rpm.

During this process, the pH of the dispersion liquid would rise and, therefore, acid was continually added to maintain the pH within 6.0±0.3 to thereby control the pH in the reactor continuously. After the dispersion was completed in about 20 minutes, the pH was further controlled by the addition of acid for additional 3 hours. Then, it was confirmed that the pH remained in a range of 6.0±0.3 for one hour without the addition of acid, and then the reaction was ended.

After solid-liquid separation with a Buchner flirtation unit, the zeolite-Ag was subjected to drying at 130° C. for 4 hours without washing with water to remove water and then pulverized properly into a product using a mortar of the Japanese pharmacopoeia.

The obtained synthetic zeolite-Ag of the invention and the non-soaked one were subjected to the determination of pH and eluted aluminium concentration with holding temperature of 80° C. The results are as shown in Table 25.

Difference in stability to water is apparent between these. The zeolite-Ag of the invention had a neutral and stable pH with no alminium elution, and a stable product with no auto-destruction being recognized.

TABLE 25

| Zeolite | Manner | (80° C.) pH | Eluted Al Conc., ppm |
|---|---|---|---|
| (1) A-Ag | Control | 9.5 | 15.6 |
| (1) A-Ag | Invention | 6.6 | below the detection limit |

EXAMPLE 17

Synthetic zeolite of the invention was prepared by incorporating the process of the invention into usual procedure for the preparation of synthetic zeolite. Reaction apparatus used was the same as in Example 16. Raw materials for zeolite were all commercial products of Wako Pure Chemicals Co.

One liter of a 10% aqueous sodium aluminate solution was placed in the reactor, to which 0.9 liter of a 10% aqueous sodium silicate was added from a dropping instrument over one hour at 60° C. under stirring at 1,000 rpm. The above temperature and stirring speed were maintained over the above period and an additional one hour after the completion of the addition. Then, the temperature in the reactor was raised to 85° C. with simultaneous decrease of a stirring speed to 500 rpm, and ripening reaction was conducted for 8 hours to form synthetic zeolite particles. After cooled, the synthetic zeolite was taken out from the reactor, wherein the whole amount of 1.9 liters of the dispersion containing the reaction product were divided into two aliquots: (A) one was treated in a conventional manner; and (B) the other was processed according to the invention. That is, in (A), solid-liquid separation was carried out with a Buchner filtration unit, and sufficient washing was performed by pouring portionwise a large amount of demineralized water to remove unreacted materials and perform excessive rinsing. After it was confirmed that the filtrate became approximately neutral, the washing was stopped. Then, the synthetic zeolite was dried at 130° C. for 4 hours and pulverized properly into a product. In (B) on the other hand, solid-liquid separation was carried out with a Buchner filtration unit and washing water was added from above to remove unreacted materials. Then, the residual solid was made a slurry with a small amount of demineralized water. One liter of demineralized water and a synthetic zeolite solution in acid (prepared by dissolving 0.5 g of synthetic zeolite treated in above (A) in a small amount of concentrated nitric acid under heating) were added to the reactor, to which the synthetic zeolite for (B) was added little by little and subjected to the operation of the invention. The reaction conditions included the use of 10% nitric acid, room temperature, stirring speed of 500 rpm and maintained pH of 5.5±0.3. After the completion of addition of the zeolite, the pH was controlled with the addition of acid for further 2 hours, and then it was confirmed that the pH remained at the aforesaid value without the addition of acid for one hour. After solid-liquid separation with a Buchner filtration unit, the synthetic zeolite was dried at 130° C. for 4 hours without washing and pulverized properly.

The pH and eluted aluminium concentration of the obtained zeolite were determined with a holding temperature of 80° C. The results are as shown in Table 26.

It is apparent that stability of the product of the invention is outstandingly excellent.

TABLE 26

| Method | (80° C.) pH | Eluted Al Conc., ppm |
|---|---|---|
| (A) Conventional | 10.4 | 19.6 |
| (B) Invention | 6.5 | below the detection limit |

EXAMPLE 18

This Example is to illustrate that a manner of washing after soaking of zeolite with acid is critical to the invention. From synthetic zeolite particles (1), (2) and (3), synthetic zeolite of the invention was prepared in the following manner.

One liter of demineralized water was placed in a two-liter reactor provided with a stirrer and an acid-dropping instrument containing a 5% aqueous phosphoric acid solution. Separately, 0.5 g of each synthetic zeolite was dissolved in 5 g of concentrated nitric acid under heating, and added together with a small amount of water. Then, 100 g of the corresponding synthetic zeolite were gradually added to disperse at 30° C. and a stirring speed of 500 rpm. During this process, the pH of the dispersion liquid in the reactor would rise and, therefore, acid was continually added from the acid-dropping instrument to maintain the pH within 5.0±0.3 and thereby control the pH in the reactor continuously. After the addition of the synthetic zeolite solid particles was completed in about 30 minutes, the pH was further controlled with the addition of acid for additional 2 hours. Then, it was confirmed that the pH remained in a range of 5.0±0.3 for 1 hour and the process was ended.

After solid-liquid separation with a Buchner filtration unit, the synthetic zeolite was dried at 220° C. for 3 hours to remove water and pulverized properly with a mortar of the Japanese pharmacopoeia.

As another embodiment, after solid-liquid separation with a Buchner filtration unit, the same procedure as above was repeated to treat synthetic zeolite with the exception that 3.0 liters of an aqueous acetic acid adjusted to pH 3.8 were poured little by little from above for washing, wherein the pH of the last 1 liter of the washing liquid in the washing process was about 5.

For comparison, the above procedure was repeated with the exception that 3.0 liters of demineralized water were poured little by little from above for washing with water.

The pH and eluted aluminium concentration of each synthetic zeolite were determined with a holding temperature of 80° C. The results are as shown in Table 27. The synthetic zeolite accompanied with the washing by water for comparison was unstable to, water, while the synthetic zeolite of the invention was apparently stable.

TABLE 27

| Zeolite | Manner | (80° C.) pH | Eluted Al Conc., ppm |
|---|---|---|---|
| (1) A | Not Washed | 6.4 | below the detection limit |
| (2) Y | Not Washed | 6.4 | below the detection limit |
| (3) X | Not Washed | 6.2 | below the detection limit |
| (1) A | Washing With Acid | 6.3 | below the detection limit |
| (2) Y | Washing With Acid | 6.3 | below the detection limit |
| (3) X | Washing With Acid | 6.2 | below the detection limit |
| (1) A | Washing With Water | 9.5 | 6.1 |
| (2) Y | Washing With Water | 9.1 | 3.5 |
| (3) X | Washing With Water | 8.9 | 3.2 |

Control 4 pH's and eluted aluminium concentrations of the aforesaid zeolites (1) to (8) were determined with a holding temperature of 37° C. The results are as seen in Table 28.

TABLE 28

| Zeolite | (37° C.) pH | Eluted Al Concentration, ppm |
|---|---|---|
| (1) A | 12.2 | 40.2 |
| (2) Y | 11.0 | 15.6 |
| (3) X | 11.1 | 13.0 |
| (4) A | 11.1 | 16.0 |
| (5) A | 11.4 | 12.7 |
| (6) A | 10.6 | 15.9 |
| (7) Y | 11.2 | 8.2 |
| (8) X | 10.9 | 10.6 |

EXAMPLE 19

Synthetic zeolite of the invention was prepared from the aforesaid eight types of synthetic zeolite as follows.

One liter of demineralized water was placed in a two-liter reactor provided with a stirrer and an acid-dropping instrument containing a 10% aqueous nitric acid solution (same reactor as in Example 14). An initial pH of the demineralized water-was adjusted to 4. Separately, 5 g of water glass (silicic acid content 35 to 38%) as an additive were dissolved in 100 ml of demineralized water, to which 100 g of synthetic zeolite were added to prepare a dispersion. This synthetic zeolite dispersion was added little by little to the aforesaid demineralized water in the reactor at 30° C. under stirring at 500 rpm. During this process, the pH of the dispersion liquid in the reactor would rise and, therefore, acid was continually added from the acid-dropping instrument to maintain the pH within 5.0±0.3 to thereby control the pH in the reactor continuously. After the addition of the synthetic zeolite particles was completed in about 20 minutes, the pH was further controlled within a range of 5.0±0.3 for additional 2 hours. Then, it was confirmed that the pH remained constant for one hour without the addition of acid, and then the acid treatment was ended.

After slid-liquid separation with a Buchner filtration unit, the synthetic zeolite was subjected to drying at 130° C. for 4 hours without washing with water to remove water and then pulverized properly into a product using a mortar of the Japanese pharmacopoeia.

The resultant synthetic zeolite of the invention was dispersed in distilled water and subjected to the determination of pH and eluted aluminium concentration with a holding temperature of 37° C. The results are as shown in Table 29. Stability to water was very good in all of the cases.

TABLE 29

| Zeolite | (37° C.) pH | Eluted Al Concentration, ppm |
|---|---|---|
| (1) A | 6.6 | below the detection limit |
| (2) Y | 6.4 | " |
| (3) X | 6.5 | " |
| (4) A | 6.6 | " |
| (5) A | 6.6 | " |
| (6) A | 6.4 | " |
| (7) Y | 6.6 | " |
| (8) X | 6.5 | " |

Figure 5:

FIG. 5 is an electron microscopic photograph (x 20,000) of synthetic zeolite (5) of the invention. To compare with FIG. 3, i.e. electron microscopic photograph (x 20,000) of synthetic zeolite which was not treated by the process of the invention, it is clear that the surface of the synthetic zeolite of the invention was covered.

EXAMPLE 20

From conventional zeolite (4), (7) and (8), synthetic zeolite of the invention was prepared. The reaction apparatus used was the same as that used in Examples 14 and 19. The used acid was, however, a 10% aqueous acetic acid solution.

One liter of demineralized water was placed in the reactor. A initial pH of the demineralized water was adjusted to 5. Separately, 3 g of sodium aluminate as an additive were dissolved in 100 ml of demineralized water, to which 100 g of synthetic zeolite were added to prepare a dispersion. This synthetic zeolite dispersion was added little by little to the aforesaid demineralized water in the reactor at 35° C. under stirring at 500 rpm. During this process, the pH of the dispersion liquid in the reactor would rise and, therefore, acid was continually added to maintain the pH within 6.0±0.3 to thereby control the pH in the reactor continuously. After the addition of the synthetic zeolite was completed in about 20 minutes, a solution of 0.5 g of sodium potassium tartrate in a small amount of water was added. The pH was further controlled within 6.0±0.3 by the addition of acid for additional 8 hours. Then, it was confirmed that the pH remained almost constant for two hours without the addition of acid, and then the acid treatment was ended.

After solid-liquid separation with a Buchner filtration unit, the synthetic zeolite was subjected to drying at 150° C. for 3 hours without washing with water to remove water and then pulverized properly into a product using a mortar of the Japanese pharmacopoeia.

The resultant synthetic zeolite of the invention was dispersed in distilled water and subjected to the determination of pH and eluted aluminium concentration with a holding temperature of 37° C. The results are as shown in Table 30. Stability to water was very good.

TABLE 30

| Zeolite | pH | (37° C.) Eluted Al Concentration, ppm |
|---|---|---|
| (4) A | 6.8 | below the detection limit |
| (7) Y | 6.7 | " |
| (8) X | 6.8 | " |

COMPARISON EXAMPLE 5

Comparison Example 1 was repeated with the exception that a holding temperature before the determination of pH and eluted aluminium concentration was 37° C. instead of 20° to 25° C.

The results are as shown in Table 31. The same comments as stated in Comparison Example 1 also apply here in comparison between Tables 28 and 31.

TABLE 31

| Zeolite | Treatment | (37° C.) pH | Eluted Al Conc., ppm |
|---|---|---|---|
| (4) A | Washing | 9.6 | 12.2 |
| (7) Y | Washing | 9.6 | 6.9 |
| (8) X | Washing | 9.3 | 9.4 |
| (4) A | Neutralization | 9.2 | 10.9 |
| (7) Y | Neutralization | 9.4 | 6.0 |
| (8) x | Neutralization | 9.3 | 8.3 |

EXAMPLE 21

Synthetic zeolite of the second embodiment of the invention and synthetic zeolite, for reference, which was not given an additive but treated with acid were prepared using conventional synthetic zeolite (5) under the following conditions:

(A) an additive was used which was prepared by dissolving 2 g of sodium carboxymethyl cellulose (hereinafter, CMC-Na) in 100 ml of demineralized water, (B) an additive was used which was prepared by dissolving 2 g of sodium polyacrylate (polymerization degree 2700 to 7500, hereinafter PA-Na) in 100 ml of demineralized water, or (C) no additive was used.

The same reaction apparatus as in Example 14 was used. A 10% aqueous nitric acid was used as acid.

One liter of demineralized water was placed in the rector and an initial pH was adjusted to 5. A dispersion of 100 g of synthetic zeolite in the aforesaid solution of the additive or neat synthetic zeolite was added to the reactor little by little to disperse at 35° C. under stirring at 500 rpm. During this process, the pH of the dispersion liquid in the reactor would rise and, therefore, acid was continually added to maintain the pH within 5.5±0.3 to thereby control the pH in the reactor continuously. After the addition of the synthetic zeolite dispersion was completed in about 20 minutes, the pH was further controlled within 5.5±0.3 by the addition of acid for additional 2 hours. Then, it was confirmed that the pH remained almost constant for two hours without the addition of acid, and then the acid treatment was ended.

After solid-liquid separation with a Buchner filtration unit, the synthetic zeolite was subjected to drying at 120° C. for 4 hours without washing with water to remove water and then pulverized properly into a product using a mortar of the Japanese pharmacopoeia.

The resultant synthetic zeolite of the invention was dispersed in distilled water and subjected to the determination of pH and eluted aluminium concentration at 37° C. and 80° C. as in Example 14. The results are as shown in Table 32 (holding temperature of 37° C.) and Table 33 (holding temperature of 80° C.). At 37° C., stability to water of the synthetic zeolite were all very good. At 80° C., the products of the second embodiment of the invention were still stable, but the product with no additive as reference showed a little high pH and eluted aluminium. (However, it still is more stable than one which was not treated with acid. See Table 21.)

Figure 6:
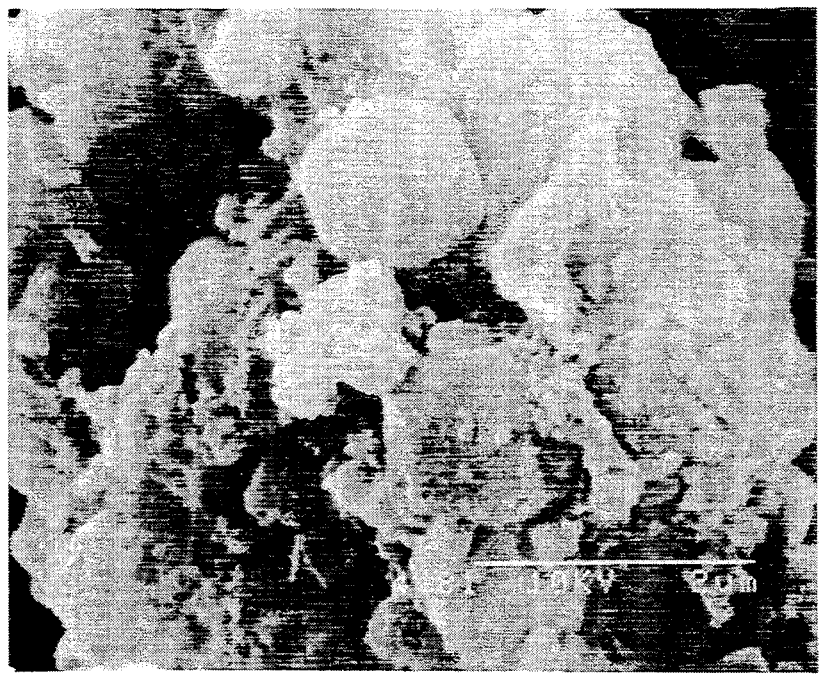
Figure 7:

FIGS. 6 and 7 are electron microscopic photographs (x 20,000) of synthetic zeolite (5) obtained with CMC-Na and PA-Na as an additive, respectively. To compare with FIG. 3, i.e. electron microscopic photograph of synthetic zeolite which was not treated according to the invention, it is apparent that the surface of the synthetic zeolite of the invention was covered.

TABLE 32

| Zeolite | Additive | (37° C.) pH | Eluted Al Conc., ppm |
|---|---|---|---|
| (5) A | CMC-NA | 6.2 | below the detection limit |
| (5) A | PA-NA | 6.3 | " |
| (5) A | None | 6.5 | " |

TABLE 33

| Zeolite | Additive | (80° C.) pH | Eluted Al Conc., ppm |
|---|---|---|---|
| (5) A | CMC-NA | 6.4 | below the detection limit |
| (5) A | PA-NA | 6.5 | below the detection limit |
| (5) A | None | 7.6 | 0.8 |

What is claimed is:

1. A stable synthetic zeolite, characterized in that when said stable synthetic zeolite is dispersed in water at a concentration of 50 g/liter and maintained at a temperature of 20° to 25° C. for 24 hours, said water has a pH in the range of from 5 to 7.

2. The stable synthetic zeolite as claimed in claim 1, wherein the pH is in a range of from 6.0 to 6.8.

3. A stable synthetic zeolite, characterized in that said stable synthetic zeolite when dispersed in water at a concentration of 50 g/liter and maintained at a temperature of 50° C. for 24 hours, said water has a pH in the range of from 5 to 7.

4. The stable synthetic zeolite as claimed in claim 3, wherein the pH is in a range of from 6.0 to 6.8.

5. A stable synthetic zeolite having its surface covered with a semipermeable gel, wherein when said stable synthetic zeolite is dispersed in water at a concentration of 50 g/liter and maintained at a temperature of 30° to 40° C. for 24 hours, said water has a pH in the range of from 5 to 7.

6. The stable synthetic zeolite as claimed in claim 5, wherein the pH is in a range of from 6.0 to 6.8.

7. The stable synthetic zeolite as claimed in claim 5, wherein when said stable synthetic zeolite is dispersed in water at a concentration of 50 g/liter and maintained at a temperature of 80° C for. 24 hours, said water has a pH of from 5 to 7.

8. The stable synthetic zeolite as claimed in claim 7, wherein the pH is in a range of from 6.0 to 6.8.

9. A process for the preparation of stable synthetic zeolite, wherein synthetic zeolite is soaked in an acid aqueous liquid; acid is replenished to maintain a pH of the soaking liquid at a value larger than 4.0 and at most 6.5 and the soaking is continued until the pH remains approximately constant within a range of ±0.3 for at least one hour without replenishing the acid; and then the synthetic zeolite is heat-dried without being washed or after washed in conditions that the pH of a washing liquid does not substantially exceed about 6.5.

10. The process as claimed in claim 9, wherein the synthetic zeolite is washed with an acid aqueous liquid of a pH of 6.5 or less or a small amount of water between the soaking and the drying.

11. The process as claimed in claim 9, wherein weak acid is used in the soaking liquid.

12. The process as claimed in claim 9, wherein the soaking liquid contains metal ion.

13. The process as claimed in claim 9, wherein the soaking liquid contains metal ion selected from the group consisting of silver, copper and zinc ions.

14. The process as claimed in claim 9, wherein the process is preceded with a step where the synthetic zeolite is soaked in an acid aqueous preliminary soaking liquid maintained at a pH of 4 or less, wherein acid is replenished, if needed, to maintain the pH of the preliminary soaking liquid at 4 or less.

15. The process as claimed in claim 14, wherein the pH of the preliminary soaking liquid in the preceding step is maintained in a range of from 3.0 to 3.8.

16. The process as claimed in claim 14, wherein the soaking in the preceding step is conducted for one hour or less.

17. The process as claimed in claim 14, wherein the soaking in the preceding step is conducted for 10 to 30 minutes.

18. The process as claimed in claim 14, wherein the synthetic zeolite is washed with an acid aqueous liquid of a pH of 6.5 or less or a small amount of water between the soaking and the drying.

19. The process as claimed in claim 14, wherein weak acid is used in the preliminary soaking liquid.

20. The process as claimed in claim 9, wherein the soaking liquid contains a gel-forming substance.

21. The process as claimed in claim 20, wherein the gel-forming substance is selected from the group consisting of aluminosilicate, silicic acid, silicate, aluminate, alumina, natural semipermeable high molecular weight substances selected from the group consisting of gelatin, agar, sodium allginate and cellulose derivatives, and semipermeable synthetic polymers selected from the group consisting of PVA derivatives, regenerated cellulose derivatives, acrylic acid derivatives, melamine resin derivatives and phenol resin derivatives.

22. The process as claimed in claim 20, wherein the amount of the gel-forming substance is 0.01 to 1% by weight based on the whole synthetic zeolite.

23. The process as claimed in claim 20, wherein the synthetic zeolite is washed with an acid aqueous liquid of a pH of 6.5 or less or a small amount of water between the soaking and the drying.

24. The process as claimed in claim 20, wherein weak acid is used in the soaking liquid.

* * * * *